US007650399B2

(12) United States Patent
Fukasawa et al.

(10) Patent No.: US 7,650,399 B2
(45) Date of Patent: Jan. 19, 2010

(54) PROCESSING METHOD OF DEVICE INFORMATION AND NETWORK DEVICE IN DEVICE INFORMATION MANAGEMENT SYSTEM

(75) Inventors: Nobuaki Fukasawa, Tokyo (JP); Hideo Sanbe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 11/865,570

(22) Filed: Oct. 1, 2007

(65) Prior Publication Data

US 2008/0028060 A1 Jan. 31, 2008

Related U.S. Application Data

(62) Division of application No. 11/439,975, filed on May 25, 2006, now abandoned, which is a division of application No. 09/624,384, filed on Jul. 27, 2000, now Pat. No. 7,058,705.

(30) Foreign Application Priority Data

Aug. 2, 1999 (JP) ................................. 11-219048
Aug. 2, 1999 (JP) ................................. 11-219053

(51) Int. Cl.
*G06F 15/173* (2006.01)
(52) U.S. Cl. ....................... 709/223; 709/224; 709/203; 709/217
(58) Field of Classification Search ......... 709/223–224, 709/203, 217, 220
See application file for complete search history.

(56) References Cited

U.S. PATENT DOCUMENTS 5,448,724 A    9/1995  Hayashi
5,471,617 A *  11/1995 Farrand et al. .............. 709/223
5,491,796 A    2/1996  Wanderer
5,537,642 A    7/1996  Glowny
5,611,046 A    3/1997  Russell
5,611,050 A    3/1997  Theimer (Continued)

FOREIGN PATENT DOCUMENTS

JP          05-53954          3/1993

(Continued)

OTHER PUBLICATIONS

D. J. Fermaint., Global Network Management System (GNMS), Military Communications Conference, 1994. MILCOM '94. IEEE Fort Monmouth, NJ, USA, Oct. 2-5, 1994, New York, NY, pp. 660-663.

(Continued)

*Primary Examiner*—Philip B Tran
(74) *Attorney, Agent, or Firm*—Fitzpatrick, Cella, Harper & Scinto

(57) ABSTRACT

In a device information management system in which a management server for managing device information and various devices are connected, a plurality of different types of device information is transmitted to the management server at predetermined timings, respectively. In a device information management system in which a management server for managing device information and various devices are connected, a request to transmit the device information to the management server is transmitted to another device and the device information of the requesting device is transmitted to the management server in accordance with the request.

18 Claims, 19 Drawing Sheets

U.S. PATENT DOCUMENTS

| | | | |
|---|---|---|---|
| 5,619,615 | A | 4/1997 | Pitchaikani |
| 5,710,885 | A | 1/1998 | Bondi |
| 5,764,911 | A | 6/1998 | Tezuka |
| 5,796,951 | A | 8/1998 | Hamner |
| 5,852,713 | A | 12/1998 | Shannon |
| 6,047,320 | A | 4/2000 | Tezuka |
| 6,054,987 | A | 4/2000 | Richardson |
| 6,076,106 | A | 6/2000 | Hamner |
| 6,101,541 | A | 8/2000 | Ellesson |
| 6,141,680 | A | 10/2000 | Cucchiara |
| 6,249,814 | B1 | 6/2001 | Shaffer |
| 6,266,693 | B1 | 7/2001 | Onaga |
| 6,308,205 | B1 * | 10/2001 | Carcerano et al. ........... 709/221 |
| 6,343,320 | B1 * | 1/2002 | Fairchild et al. ............ 709/224 |
| 6,360,255 | B1 * | 3/2002 | McCormack et al. ....... 709/221 |
| 6,389,464 | B1 * | 5/2002 | Krishnamurthy et al. .... 709/220 |
| 6,397,248 | B1 * | 5/2002 | Iyer ........................... 709/223 |
| 6,418,469 | B1 | 7/2002 | Justice |
| 6,425,006 | B1 * | 7/2002 | Chari et al. ................. 709/224 |
| 6,430,612 | B1 | 8/2002 | Iizuka |
| 6,430,711 | B1 | 8/2002 | Sekizawa |
| 6,490,617 | B1 * | 12/2002 | Hemphill et al. ............ 709/223 |
| 6,496,859 | B2 | 12/2002 | Roy |
| 6,502,132 | B1 | 12/2002 | Kumano |
| 6,526,442 | B1 | 2/2003 | Stupek |
| 6,732,170 | B2 | 5/2004 | Miyake |
| 6,735,626 | B1 | 5/2004 | Tezuka |
| 7,058,705 | B1 | 6/2006 | Fukasawa |

FOREIGN PATENT DOCUMENTS

| | | |
|---|---|---|
| JP | 05-274239 | 10/1993 |
| JP | 07-21135 | 1/1995 |
| JP | 07-55494 | 3/1995 |
| JP | 09-218835 | 8/1997 |
| JP | 10-294731 | 11/1998 |
| JP | 10-303831 | 11/1998 |
| JP | 2001-43159 | 2/2001 |

OTHER PUBLICATIONS

J. Veizades, et al., "Service Location Protocol—RFC 2165", Internet Engineering Task Force, Jun. 1997. <URL: http://www.faqs.org/rfcs/rfc2165.html> retrieved Dec. 18, 1991.

J. Veizades, et al., "Service Location Protocol—RFC 2165" Internet Engineering Task Force, [online] Jun. 1997. <URL:http://www.faqs.org/rfcs/rfc2165.html.> [retrieved on Dec. 18, 2001].

D.J. Fermaint, Global network management system (GNMS), Military Communications Conference, 1994, pp. 661-663.

* cited by examiner

FIG. 5

Directory Registration Information 500

| Device Name (501) | Network Address (502) | Service Type (503) | Attribute-1 scope (504) | Attribute-2 location (505) | Attribute-3 paper size (506) | Attribute-4 option (507) | Attribute-5 device status (508) | Updateable Device Address (509) |
|---|---|---|---|---|---|---|---|---|
| Directory Server | service: dir-svr.canon.co.jp | directory-agent | all | 2floor | none | hd | active | service: dir-svr.canon.co.jp |
| Mr. Color | service: prn-clor.canon.co.jp | printer | develop | 2floor | A4 | cassette | ready | service: prn-clor.canon.co.jp service: admin.canon.co.jp |
| 2nd Floor High-Speed | service: prn-mfp.canon.co.jp | mfp | user | 2floor | A4,A3 | sorter finisher | ready | service: prn-mfp.canon.co.jp |
| Development Printer | service: prn-mono.canon.co.jp | printer | develop | 2floor | A4 | cassette | ready | service: prn-mono.canon.co.jp |
| SNMP Admin | service: admin.canon.co.jp | snmp | all | 2floor | none | none | active | service: admin.canon.co.jp |
| 1st Floor Printer | 192.168.16.104 | printer | user | 1floor | A4 | sorter finisher | busy | 192.168.16.104 |
| Scanner | 192.168.16.105 | scanner | all | 1floor | A4,A3 | none | ready | 192.168.16.105 |
| ---- | ---- | ---- | ---- | ---- | ---- | ---- | ---- | ---- |

| TYPE OF INFO | REGISTERED/UPDATED UPON |
|---|---|
| STATIC INFO | POWER ON |
| SEMISTATIC INFO | POWER ON & CHANGE IN DEVICE CONFIGURATION |
| DYNAMIC INFO | POWER ON & CHANGE IN INFO |

FIG. 12

SETUP FOR DEVICE INFO REFERENCE TIMING — 1200

DEVICE NAME — 1201

MR. COLOR

| TYPE OF INFO (1202) | REFERENCE TIMING (1203) |
|---|---|
| STATIC INFO | MANUAL |
| SEMISTATIC INFO | EVERY 5 HOURS |
| DYNAMIC INFO | EVERY 10 MINS |

FIG. 19

```
--INFO ON SUBSTITUTE DEVICE
--ALLOW SUBSTITUTE DEVICE TO UPDATE REGISTRATION INFO IN DIRECTORY SERVER WHEN
   TROUBLES ARISE IN THE DEVICE anotherManager OBJECT-TYPE
   SYNTAX      INTEGER {(1) REQUEST SUBSTITUTE, (2) NOT REQUEST}
   MAX-ACCESS  READ-WRITE
   STATUS      CURRENT
   DESCRIPTION "INDICATING WHETHER SUBSTITUTE IS REQUESTED"

deviceCondition OBJECT-TYPE
   SYNTAX      INTEGER {(1) DOWN, (2) ERROR}
   MAX-ACCESS  READ-WRITE
   STATUS      CURRENT
   DESCRIPTION "INDICATING CONDITIONS FOR SUBSTITUTE"

anotherManagerAction OBJECT-TYPE
   SYNTAX      INTEGER {(1) DELETE ALL}
   MAX-ACCESS  READ-WRITE
   STATUS      CURRENT
   DESCRIPTION "INDICATING PROCESSING TO BE EXECUTED BY SUBSTITUTE DEVICE WHEN
                THE DEVICE IS IN device Condition"

anotherManagerNetworkAddress OBJECT-TYPE
   SYNTAX      OCTET STRING SIZE (0..10)
   MAX-ACCESS  READ-WRITE
   STATUS      CURRENT
   DESCRIPTION "NETWORK ADDRESS OF SUBSTITUTE DEVICE"
```

PROCESSING METHOD OF DEVICE INFORMATION AND NETWORK DEVICE IN DEVICE INFORMATION MANAGEMENT SYSTEM

This application is a divisional of application Ser. No. 11/439,975, filed on May 25, 2006 (now abandoned), which is a divisional of application Ser. No. 09/624,384, filed on Jul. 27, 2000, now U.S. Pat. No. 7,058,705, issued on Jun. 6, 2006.

BACKGROUND OF THE INVENTION

1. Field of the Invention

The invention relates to a device information management system for managing device information of each device connected to a network, a device information managing method, a computer-readable recording medium in which a device information managing program has been stored, and the device information managing program.

2. Related Background Art

Hitherto, in a network system such that a directory server, various devices, and various computers are connected and device information of each device has been registered in the directory server, the device registers all of its own device information into the directory server and updates the device information registered in the directory server.

An application of a computer uniformly obtains all of the device information of the devices to be used from the directory server at same intervals in the device information registered in the directory server.

SUMMARY OF THE INVENTION

In the above conventional technique, however, since the device registers all of its own device information into the directory server (or updates all of its own device information registered in the directory server; hereinafter, the registration and updating of the device information are collectively expressed by "registration"), the device information which does not need to be registered is also transmitted to the directory server. There is, consequently, such a problem that there is a waste of traffic from a viewpoint of a traffic load on the network.

Since the application of the computer uniformly obtains all of the device information of the devices to be used at same intervals, all of the device information which is not changed or is rarely changed is also transmitted to the computer. Thus, there is a problem such that there is a waste of traffic from a viewpoint of a traffic load on the network.

When an abnormality such as power shut-off, trouble, or the like arises in the device, the device itself cannot perform the updating process of the information registered in the directory server. Therefore, there is a problem such that the registered device information and an actual device status do not coincide.

The invention intends to solve the problems of the conventional technique mentioned above and it is the first object of the invention to provide a device information management system and a device information managing method which can reduce a traffic load on a network.

The invention intends to solve the problems which the foregoing conventional technique has and it is the second object of the invention to provide a device information management system and a device information managing method in which even in the case where an abnormality such as power shut-off, trouble, or the like arises in the device and the device itself cannot update device information registered in a directory server, a device which can substitute an updating process can be allowed to update the device information. In such a device information management system, the registered device information and an actual device status coincide.

The third object of the invention is to provide a control program for controlling the foregoing device information management system and a recording medium on which the control program has been stored.

In the device information management system according to the invention, therefore, a plurality of device information of different types is transmitted to the management server at a predetermined timing, respectively.

In the device information management system according to the invention, a request for transmitting device information to the management server is transmitted to another device and the device information of the device which requested is transmitted to the management server in response to the request.

BRIEF DESCRIPTION OF THE DRAWINGS

FIG. 5 is a diagram showing an example of device information which a directory server has;

FIG. 12 is a diagram showing an example of a setup screen of a reference timing of the device information of the user PC;

FIG. 19 is a diagram showing an example of MIB information;

DETAILED DESCRIPTION OF THE PREFERRED EMBODIMENTS

Registration/Updating of Device Information

Figure 1:
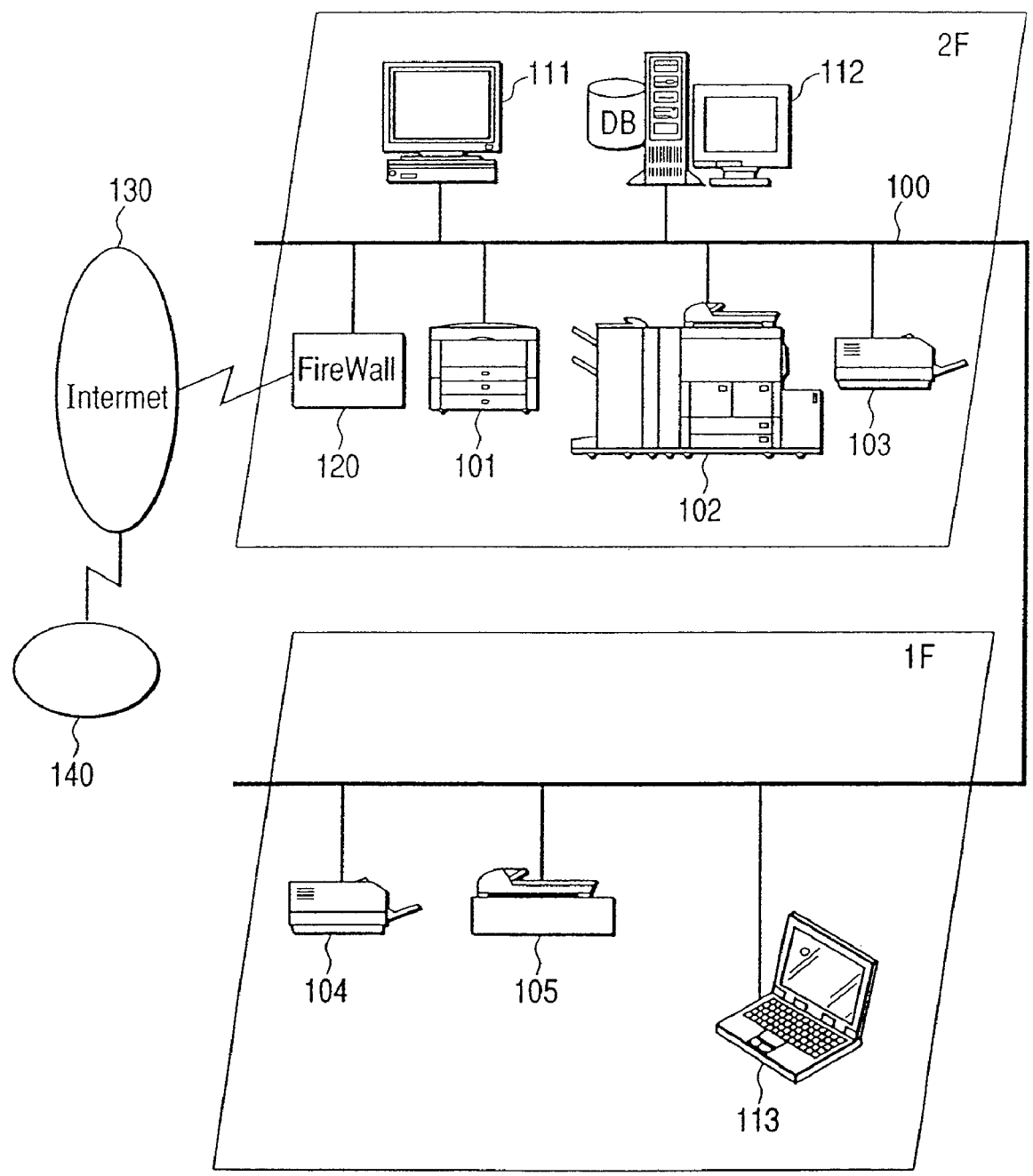
FIG. 1 is a diagram showing a construction of a device information management system.

According to the invention, in a network system in which a directory server, various devices (for example, a peripheral apparatus, a printer, a copying apparatus, a multifunction apparatus, a facsimile apparatus, a scanner), and various computers are connected, device information of each device is registered/updated and obtained by the following processes.

(1) The device information which is registered into the directory server is classified into the following three information.

static information (information which is not changed): for example, device construction information semistatic information (information which is rarely changed): for example, device option information dynamic information (information which is frequently changed): for example, device status information (2) An SLP (Service Location Protocol) directory agent exists in the directory server. The SLP directory agent manages the device information of each device connected onto a network.

(3) An SLP service agent exists in the device. The SLP service agent monitors a status and a situation of the device and registers the device information into the directory server or updates the device information on the directory server at the following timing.

When a power source is turned on, the static information, semistatic information, and dynamic information are registered into the directory server.

In a subsequent stationary state, the semistatic information and dynamic information are registered/updated into the directory server at a set timing, respectively.

The registering/updating timing of the device information is set and changed by the user.

(4) An SLP user agent exists in an application on a computer. The SLP user agent executes the following processes.

Information in the directory server is searched.

The static information, semistatic information, and dynamic information are obtained at proper intervals, respectively.

The intervals for obtaining the device information are set by the user every static information, semistatic information, or dynamic information, respectively.

The following operations appear by the above processes.

(1) The device information is classified into the static information, semistatic information, and dynamic information. By constructing in such a manner that the static information is registered only when the power source is turned on and is not registered/updated together with the semistatic information and dynamic information in the stationary state, the static information is not transmitted from the device toward the directory server via the network in the stationary state, so that a traffic load on the network is reduced.

(2) The device information other than the static information is classified into the semistatic information which is rarely changed and the dynamic information which is frequently changed. By constructing in such a manner that the semistatic information is not registered/updated together with the dynamic information, the semistatic information is not frequently transmitted from the device toward the directory server via the network, so that a traffic load on the network is reduced.

(3) The timings for registering the static information, semistatic information, and dynamic information can be set by the user, respectively. Therefore, the device information is individually registered/updated and each device information is registered/updated at a proper timing in a state where a traffic amount of the network is suppressed.

(4) The intervals at which the application on the computer obtains the three information of the static information, semistatic information, and dynamic information registered in the directory server are properly set, respectively. Thus, since the application does not need to simultaneously refer to all of the device information, a traffic amount between the directory server and the computer is reduced.

An embodiment of the invention will now be described hereinbelow with reference to the drawings.

FIG. 1 is a diagram showing a construction of a network system in which the device information management system can operate. In the diagram, reference numeral 101 denotes a color printer; 102 an MFP (Multi Function Peripheral: a copying apparatus which can be also used as a network printer); 103 and 104 monochromatic printers; and 105 a scanner connected to the network. They are devices which can execute a program of the SLP service agent. Reference numeral 111 denotes a desk-top type personal computer (hereinafter, referred to as a desk-top type PC); 112 a desk-top type personal computer having a directory server function (hereinafter, referred to as a directory server PC or directory server); 113 a notebook-sized personal computer (hereinafter, referred to as a notebook-sized PC); and 120 a fire wall. All of those devices and computers can cope with the network.

The desk-top type PC 111 and notebook-sized PC 113 are PCs which can execute a program of the SLP user agent in the embodiment and inquire device information to the SLP directory agent, as will be explained hereinlater. The directory server 112 is a device which can execute a program of the SLP directory agent in the embodiment. As will be explained hereinlater, the directory server 112 stores information regarding the devices 101 to 105, accepts an inquiry (obtains the directory information) of a search of the user information from the desk-top type PC 111 or notebook-sized PC 113, and replies the result.

Those devices are connected via a network 100 such as an LAN (Local Area Network) or the like. Those device information has been registered in the directory server PC 112 by an agent function of each device. Each device can transmit and receive data via the network 100 and provides various services.

Among those devices, it is assumed that the color printer 101, MFP 102, monochromatic printer 103, desk-top type PC 111, directory server PC 112, and fire wall 120 are installed on the second floor (2F) and the monochromatic printer 104 and scanner 105 are installed on the first floor (1F), respectively. Although the notebook-sized PC 113 is connected to the network 100 from the first floor at present, it can be removed as necessary.

The network 100 which mutually connects those PCs and devices is connected to an Internet 130 via the fire wall 120 and also connected to another network 140 via the Internet 130.

Figure 2:
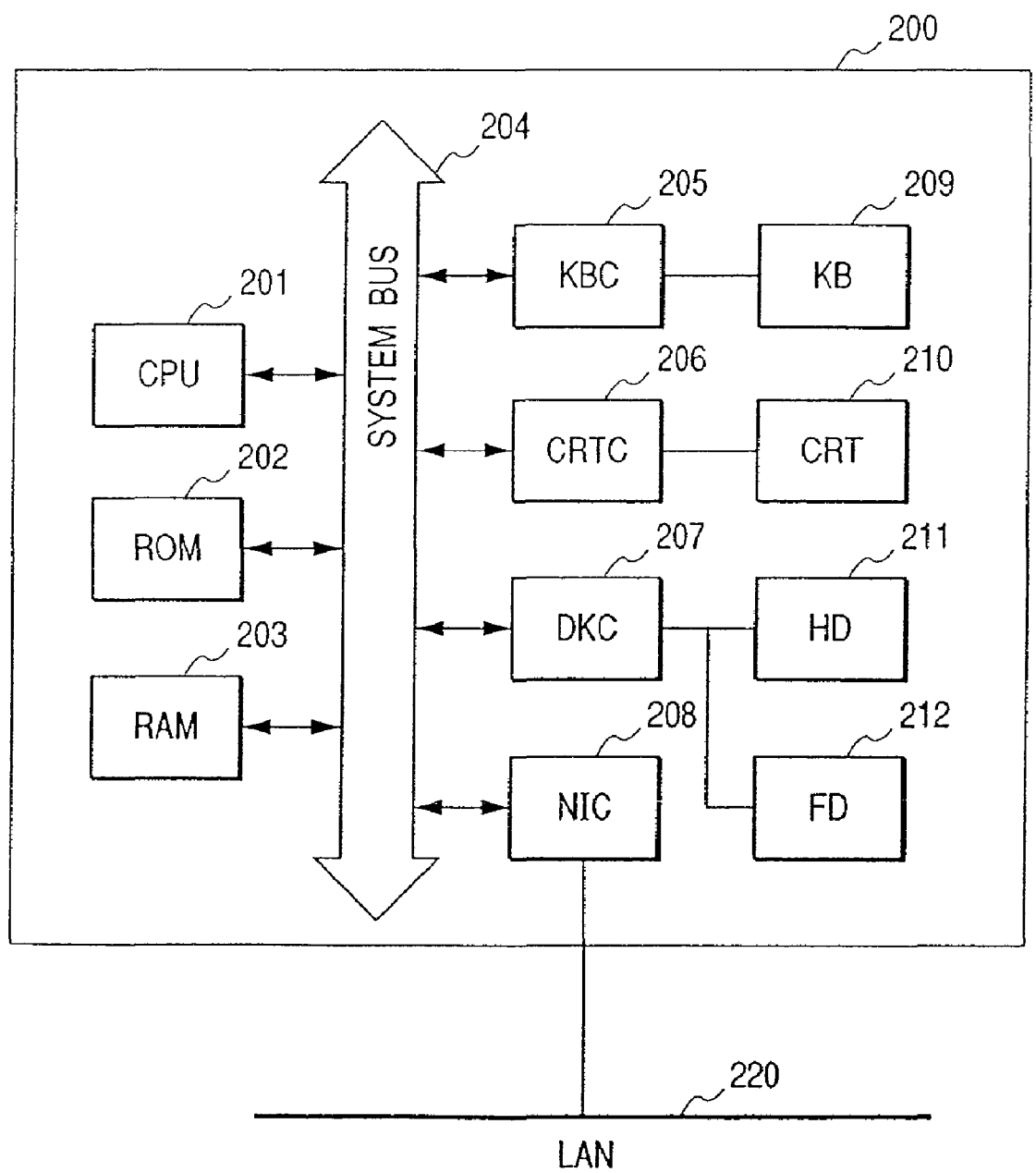
FIG. 2 is a block diagram showing an internal construction of a personal computer.

FIG. 2 is a block diagram showing an internal construction of a general personal computer (PC). In the diagram, reference numeral 200 denotes a PC (personal computer) which is equivalent to the desk-top type PC 111, directory server PC 112, or notebook-sized PC 113 in FIG. 1. In the PC 200, SLP user agent software (hereinafter, together with SLP service agent software which is installed on the device, they are referred to as SLP agent software) is operating.

The PC 200 has a CPU (Central Processing Unit) 201. The CPU 201 executes the SLP agent software which has been stored in an ROM (Read Only Memory) 202 or an HD (Hard Disk) 211 or is supplied from a floppy disk drive (FD) 212 and integratedly controls each device connected to a system bus 204.

Reference numeral 203 denotes an RAM (Random Access Memory). The RAM 203 functions as a main memory or a work area of the CPU 201. Reference numeral 205 denotes a keyboard controller (KBC). The KBC 205 controls an instruction input from a keyboard (KB) 209, a pointing device (not shown), or the like. Reference numeral 206 denotes a CRT (Cathode Ray Tube) controller (CRTC). The CRT controller 206 controls a display of a CRT display (CRT) 210. Reference numeral 207 denotes a disk controller (DKC). The HD (Hard Disk) 211 and floppy disk drive (FD) 212 stores a boot program, various applications, an edition file, a user file, a network management program, and the like. The disk controller 207 controls accesses to the HD (Hard Disk) 211 and floppy disk drive (FD) 212. Reference numeral 208 denotes a network interface card (NIC). The NIC 208 performs bidirectional data transmission and reception to/from a network apparatus such as a network printer or the like or another PC (Personal Computer) via an LAN (Local Area Network) 220.

In the embodiment, the LAN 220 is substantially the same as the network 100 in FIG. 1.

Figure 3:
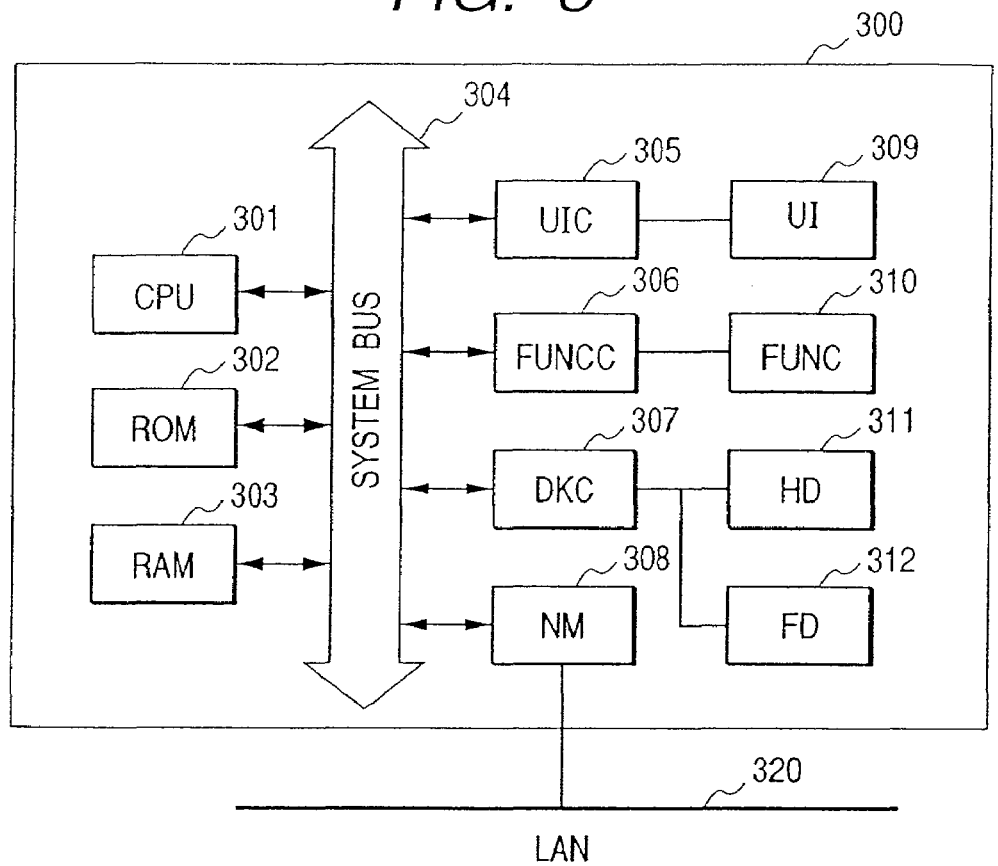
FIG. 3 is a block diagram showing an internal construction of a device.

FIG. 3 is a block diagram showing an internal construction of a device in which the SLP service agent software operates. In the diagram, reference numeral 300 denotes a device which is equivalent to the color printer 101, MFP 102, monochromatic printers 103 and 104, or scanner 105 in FIG. 1. The device 300 has a CPU (Central Processing Unit) 301. The CPU 301 executes the SLP agent software which has been stored in an ROM (Read Only Memory) 302 or a hard disk (HD) 311 or is supplied from a floppy disk drive (FD) 312 and integratedly controls each apparatus connected to a system bus 304.

Reference numeral 303 denotes an RAM (Random Access Memory). The RAM 303 functions as a main memory, a work area, or the like of the CPU 301. Reference numeral 305 denotes a user interface controller (UIC). The UIC 305 controls a display to a user interface (UI) 309 and an instruction input from the user interface (UI) 309. Reference numeral 306 denotes a function controller (FUNCC). The function controller 306 realizes and controls a function (FUNC) 310 as a peculiar function of each device. The function controller (FUNCC) is a print engine controller in case of a printer and a scan engine controller in case of a scanner. The function (FUNC) is a print engine in case of a printer and a scan engine in case of a scanner. The MFP has the function controller (FUNCC) 306 and function (FUNC) 310 every function, respectively.

Reference numeral 307 denotes a disk controller (DKC). The hard disk (HD) 311 and floppy disk drive (FD) 312 store various application programs, a data file, a network management program, and the like. The disk controller 307 controls accesses to the hard disk (HD) 311 and floppy disk drive (FD) 312. Reference numeral 308 denotes a network module (NM). The network module 308 performs bidirectional data transmission and reception to/from another network apparatus or another PC (Personal Computer) via an LAN (Local Area Network) 320. In the embodiment, the LAN 320 is substantially the same as the network 100 in FIG. 1.

Since the device can have various constructions, FIG. 3 shows a mere example.

Figure 4:
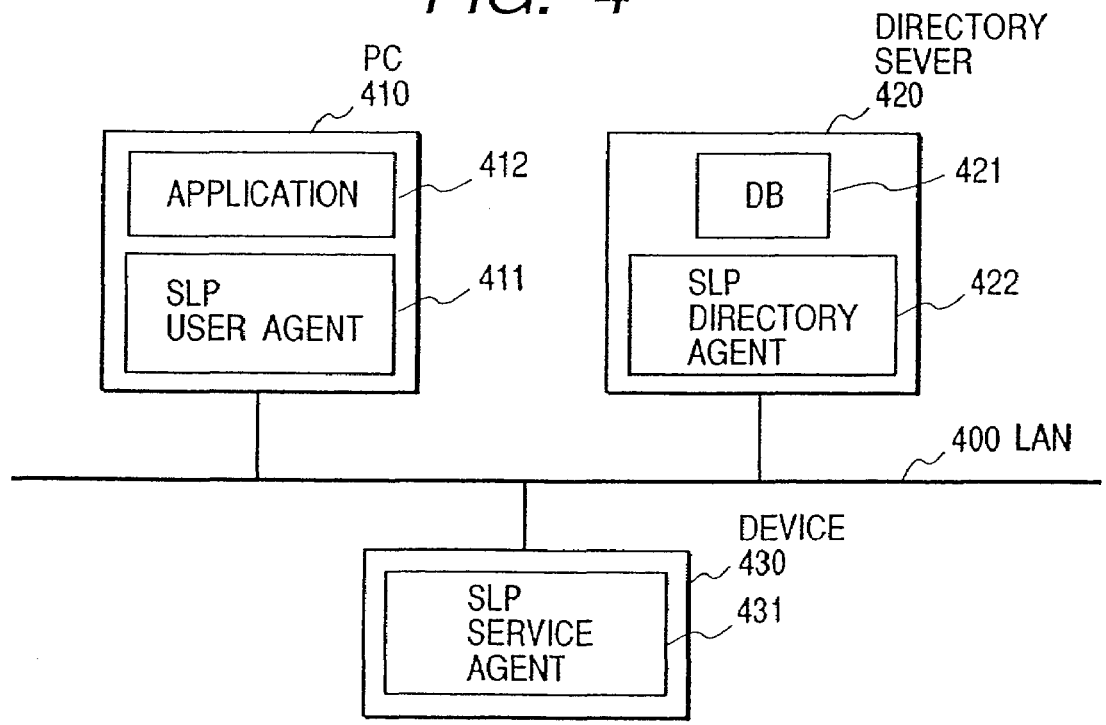
FIG. 4 is a model diagram of the device information management system.

FIG. 4 is a model diagram of a directory server, a device, and a user personal computer (hereinafter, referred to as a user PC) in the device information management system according to the embodiment. In the diagram, reference numeral 400 denotes an LAN (Local Area Network); 410 a user PC; 420 a directory server; and 430 a device. The user PC 410, directory server 420, and device 430 are connected to the LAN 400.

The user PC 410 is equivalent to the desk-top type PC 111 and notebook-sized PC 113 in FIG. 1. The directory server 420 is equivalent to the directory server 112 in FIG. 1. The device 430 is equivalent to the color printer 101, MFP 102, monochromatic printers 103 and 104, or scanner 105 in FIG. 1. The LAN 400 is equivalent to the network 100 in FIG. 1.

In the device 430, an SLP service agent 431 issues a registering request (or updating request) of the device information to an SLP directory agent 422 of the directory server 420 via the LAN 400. The SLP directory agent 422 registers the device information into a database (DB) 421. An SLP user agent 411 transmits a searching request or an obtaining request of the device information in the database (DB) 421 to the SLP directory agent 422 via the LAN 400. An application 412 receives a search result and the device information from the SLP user agent 411.

FIG. 5 is a diagram in which an example of the device information which is stored in the directory server 112 in the device information management system according to the embodiment is expressed in a table format. In the directory server 112, the information in the database (DB) 421 has physically been stored in the hard disk 211.

In FIG. 5, reference numeral 500 denotes directory registration information. The device information regarding one device has been stored in each row of the directory registration information 500. Columns show a device name 501, a network address 502 of the device, a service type 503 of the device, attributes (1) 504 to (5) 508 of the device, and an updatable device address 509.

With respect to the data shown in FIG. 5, for example, the device registered in the second row in the table will be specifically explained. A name of this device is "Mr. Color". A network address of this device is "service:prn-clor.canon.co.jp". The device has a printing function and a group which can access this device is "develop". This device is installed on the second floor. This device supports a paper of the A4 size and a cassette is provided as an option. A status of this device is set to a ready status at present. The updatable devices are "service:prn-clor.canon.co.jp" and "service:admin.canon.co.jp". The updatable device denotes a device which can update the device information.

The device name 501, network address 502, attribute (1) 504, and attribute (2) 505 correspond to the static information. The attribute (3) 506 and attribute (4) 507 correspond to the semistatic information. The attribute (5) 508 corresponds to the dynamic information.

In the embodiment, the devices of the second to fourth rows shown in FIG. 5 correspond to the color printer 101, MFP 102, and monochromatic printer 103 in FIG. 1, respectively. The devices of the sixth and seventh rows correspond to the monochromatic printer 104 and scanner 105 in FIG. 1, respectively.

The information shown in FIG. 5 is a mere example and further another additional information can exist as information to be stored in the directory server 112.

Figure 6:
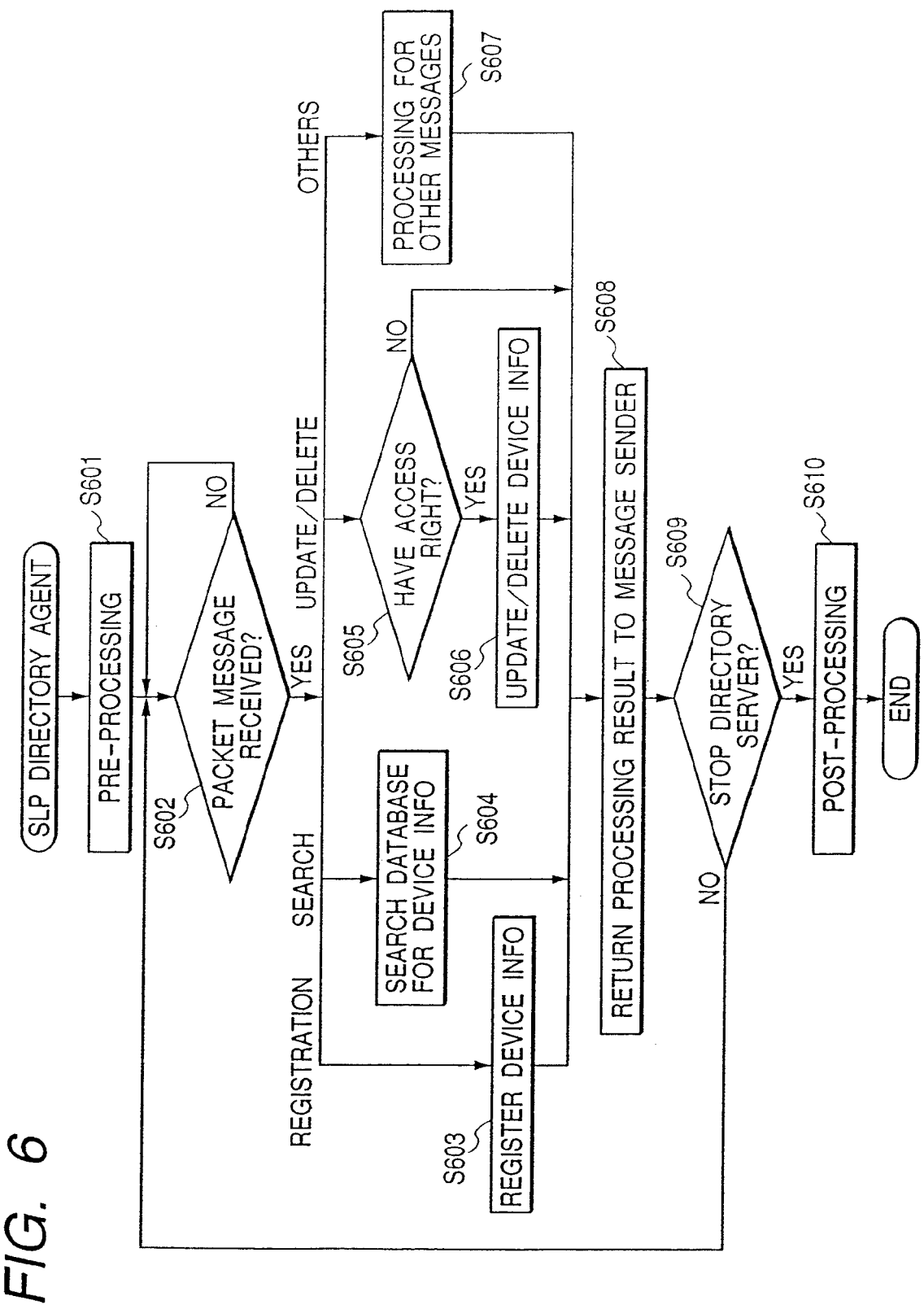
FIG. 6 is a flowchart showing the processing operation of an SLP directory agent.

FIG. 6 is a flowchart showing a flow for the processing operation of the SLP directory agent 422 in the device information management system according to the embodiment. The series of processes is executed by the CPU 201 in the directory server 420 in a hardware manner.

In FIG. 6, when the directory server 420 is activated, first in step S601, a pre-processing of the SLP directory agent 422 is performed. Subsequently, in step S602, whether a packet message from the SLP directory agent 422 or SLP service agent 431 has been received or not is discriminated.

If it is determined in step S602 that the packet message has been received and this message is a registration message, step S603 follows and the device information is registered in the database 421.

If it is determined in step S602 that the packet message has been received and this message is a search message, step S604 follows and the device information in the database 421 is searched.

If it is determined in step S602 that the packet message has been received and this message is an update (delete) message, step S605 follows. In step S605, whether the authority (access right) to update (delete) the updating-(deletion-)requested device information exists or not is discriminated. If it is determined that there is the authority, step S606 follows and the updating/deleting process is executed. If it is determined that there is not the authority, step S606 is skipped and step S608 follows.

Further, if it is determined in step S602 that the packet message has been received and this message is a message other than the above messages, step S607 follows and a process suitable for the other message is executed.

In step S608, a result of each of the above message process is transmitted to a transmitting source of the message. In step S609, whether the stop of the directory server has been requested (the directory server is stopped) or not is discriminated. If it is determined in step S609 that the directory server is not stopped, the processing routine is returned to step S602 and the apparatus waits until the packet is received again. If it is determined in step S609 that the directory server is stopped, step S610 follows and a post-processing of the SLP directory agent is performed. The processing operation is finished.

Figure 7:
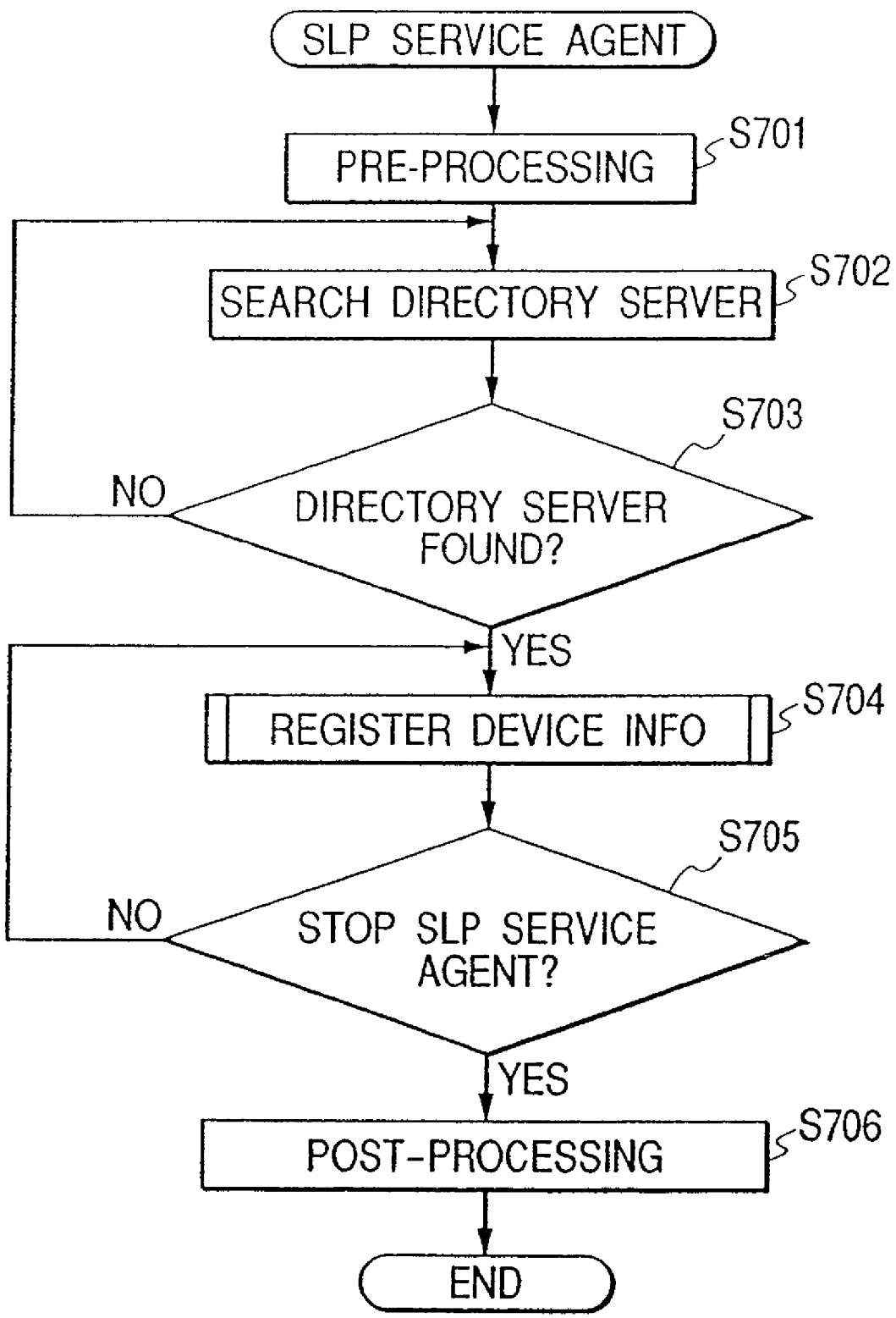
FIG. 7 is a flowchart showing the processing operation of an SLP service agent.

FIG. 7 is a flowchart showing a flow for the processing operation of the SLP service agent 431 in the device information management system according to the embodiment. The above series of processes is executed by the CPU 301 in the device 430 in a hardware manner.

In FIG. 7, when the SLP service agent 431 of the device 430 is activated, first in step S701, a pre-processing of the SLP service agent 431 is executed. Subsequently, step S702 follows and the directory server 420 is searched. In step S703, whether the directory server 420 has been found or not is discriminated. If it is decided in step S703 that the directory server 420 is not found, the processing routine is returned to step S702. If it is determined in step S703 that the directory server 420 was found, step S704 follows and the device information is registered. The details of the registering process of the device information in step S704 will be described hereinlater with reference to FIG. 8.

In step S705, whether a request to stop the SLP service agent 431 has been issued (the SLP service agent 431 is stopped) or not is discriminated. If it is determined in step S705 that the SLP service agent 431 is not stopped, the processing routine is returned to step S704. If it is determined in step S705 that the SLP service agent 431 is stopped, step S706 follows and a post-processing of the SLP service agent is performed and the processing operation is finished.

Figure 8:
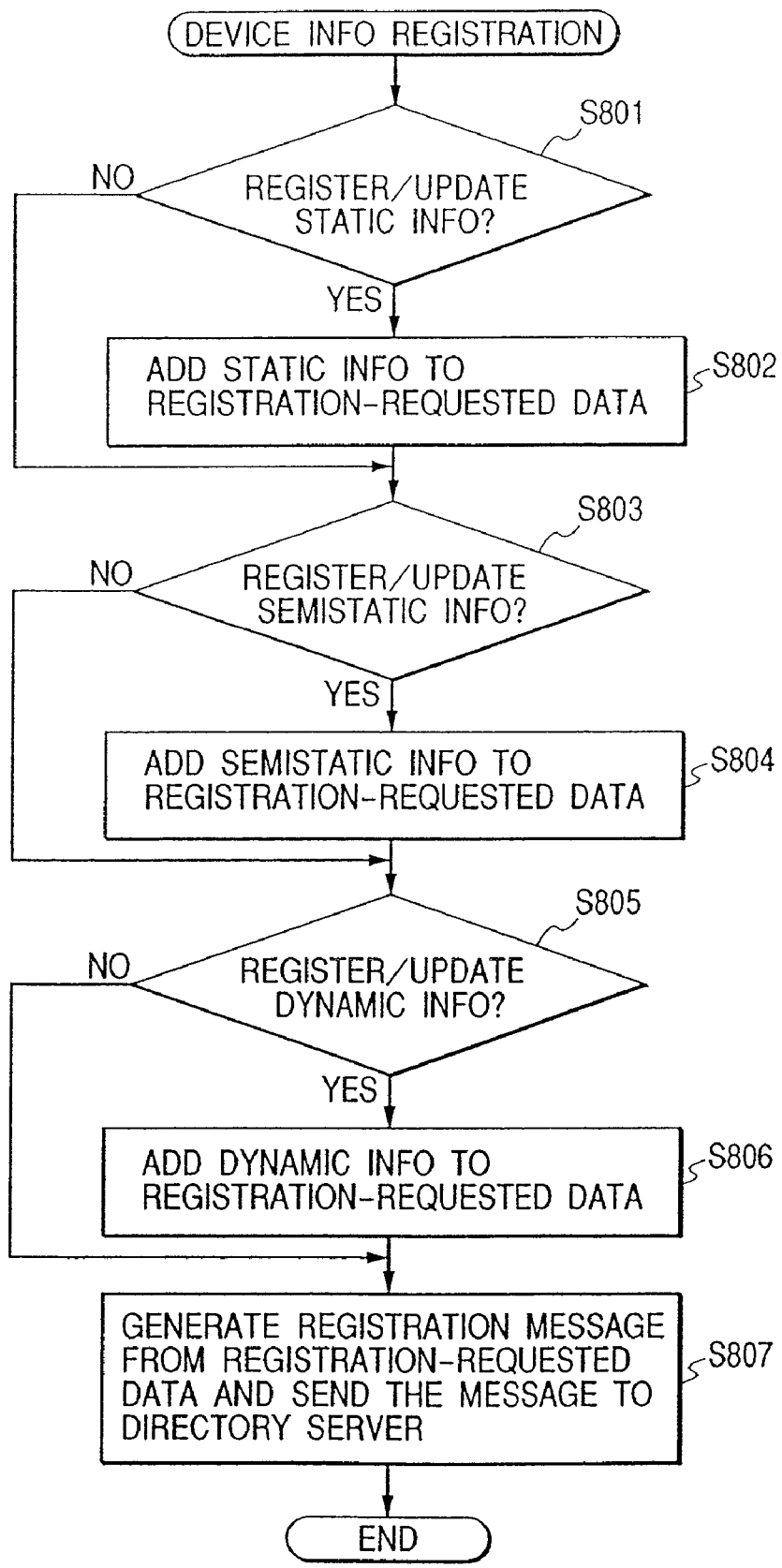
FIG. 8 is a flowchart showing a registering process of the SLP service agent.

FIG. 8 is a flowchart showing a flow for the operation of a registering process of the device information in step S704 in FIG. 7.

First, in step S801, whether the timing to register/update the static information has come or not is discriminated. The user of the device 430 can set this timing. If it is determined in step S801 that the timing at which the static information can be registered/updated has come, the processing routine advances to next step S802. The static information is added to the registration-requested data (or updating-requested data). If it is determined in step S801 that the timing is a timing at which the static information cannot be registered/updated, step S802 is skipped and step S803 follows.

In step S803, whether the timing to register/update the semistatic information has come or not is discriminated. The user of the device 430 can set the timing. If it is determined in step S803 that the timing at which the semistatic information can be registered/updated has come, step S804 follows and the semistatic information is added to registration-requested data (or updating-requested data). If it is determined in step S803 that the timing is a timing at which the semistatic information cannot be registered/updated, step S804 is skipped and step S805 follows.

In step S805, whether the timing to register/update the dynamic information has come or not is discriminated. The user of the device 430 can set the timing. If it is determined in step S805 that the timing at which the dynamic information can be registered/updated has come, step S806 follows and the dynamic information is added to registration-requested data (or updating-requested data). If it is determined in step S805 that the timing is a timing at which the dynamic information cannot be registered/updated, step S806 is skipped and step S807 follows.

In step S807, a registration message (or update message) is generated from the registration-requested data (or updating-requested data) and transmitted to the directory server 420. The processing operation is finished.

In FIG. 8, the static information, semistatic information, and dynamic information are added to the registration-requested data in steps S802, S804, and S806, respectively. However, the static information can be transmitted to the directory server 420 in step S802, the semistatic information can be transmitted to the directory server 420 in step S804, and the dynamic information can be transmitted to the directory server 420 in step S806, respectively.

Figure 9:
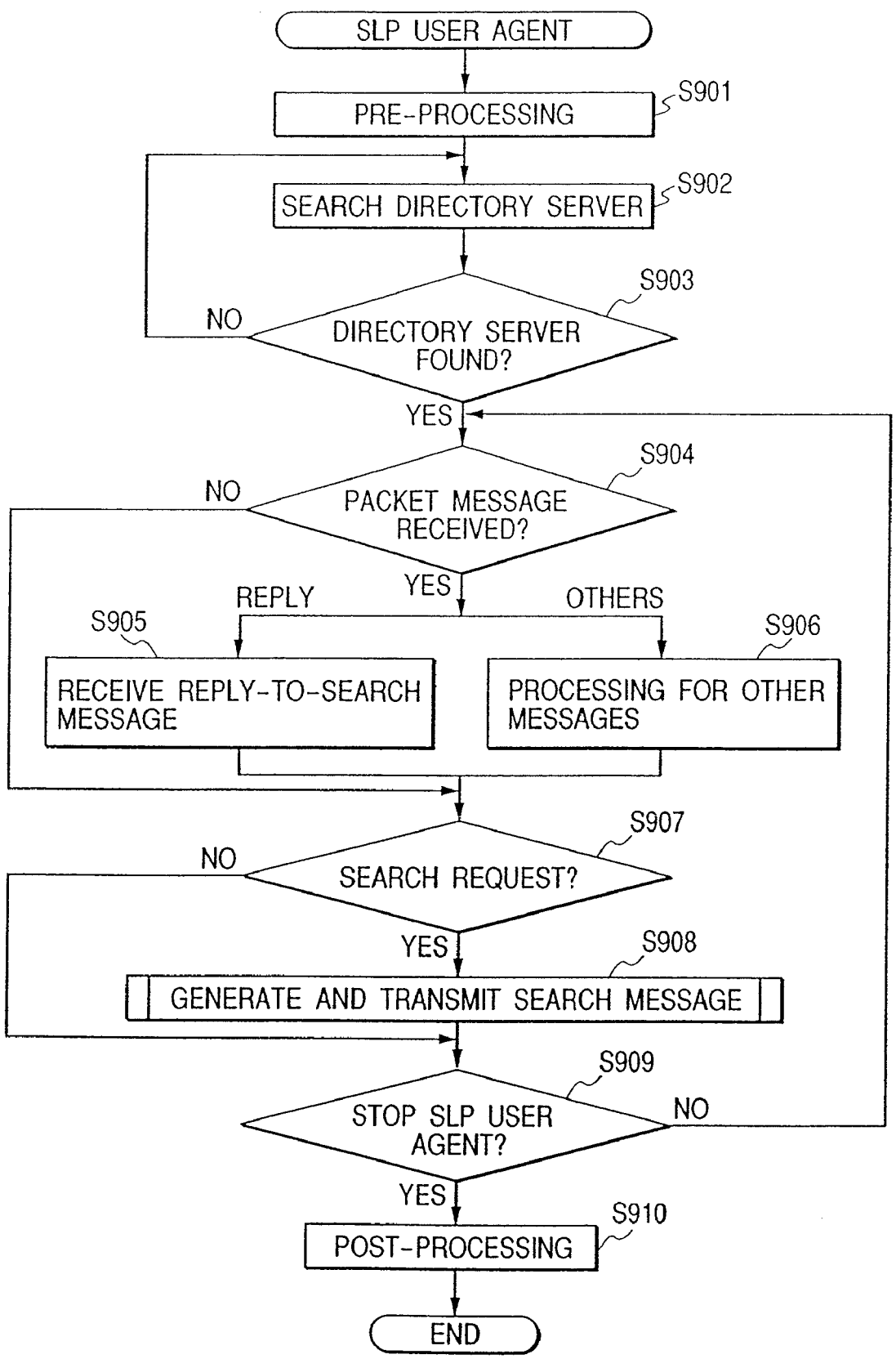
FIG. 9 is a flowchart showing the processing operation of an SLP user agent.

FIG. 9 is a flowchart showing a flow for the processing operation of the SLP user agent 411 in the device information management system according to the embodiment. The series of processes is executed by the CPU 201 in the device 200 in a hardware manner.

In FIG. 9, when the SLP user agent 411 is activated, first in step S901, a pre-processing of the SLP user agent 411 is executed. Subsequently, step S902 follows and the directory server 420 is searched. In step S903, whether the directory server 420 has been found or not is discriminated. If it is determined in step S903 that the directory server 420 is not found, the processing routine is returned to step S902. If it is decided that the directory server 420 was found, step S904 follows.

In step S904, whether the packet message has been received or not is discriminated. If it is decided in step S904 that the packet message was received and the message is a reply-to-search message, step S905 follows and a receiving process of the reply-to-search message is performed. If it is determined in step S904 that the packet message was received and the message is a message other than the reply-to-search message, step S906 follows and a process suitable for the other message is executed. If it is decided in step S904 that the packet message is not received, the processing routine directly advances to step S907.

In step S907, whether the presence or absence of a search request (also including a mere request for obtaining the device information) of the device information from the application 412 is discriminated. If it is determined in step S907 that there is the search request of the device information from the application 412, step S908 follows and a generating/ transmitting process of a search message is performed. The details of the generating/transmitting process of a search message in step S908 will be explained hereinlater with reference to FIG. 10.

If it is determined in step S907 that there is not the search request of the device information from the application 412, step S908 is skipped and step S909 follows.

In step S909, the presence or absence of a stop request of the SLP user agent 411 (whether the SLP user agent 411 is stopped or not) is discriminated. If it is decided in step S909 that the SLP user agent 411 is not stopped, the processing routine is returned to step S904. If it is decided in step S909 that the SLP user agent 411 is stopped, the processing routine advances to step S910 and a post-processing of the SLP user agent is executed. After that, the processing operation is finished.

Figure 10:
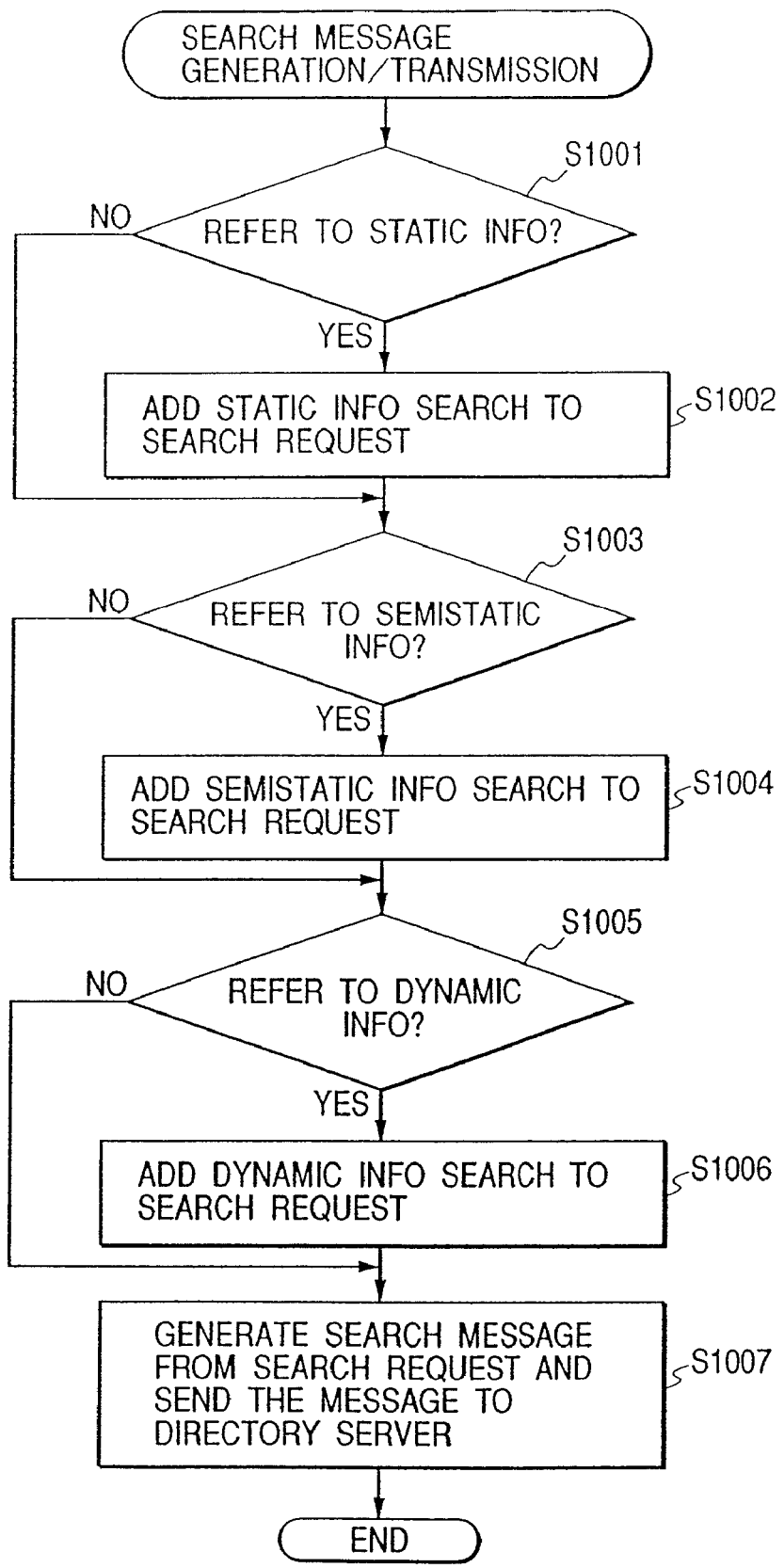
FIG. 10 is a flowchart showing a search message generating/transmitting process of the SLP user agent.

FIG. 10 is a flowchart showing a flow for the operation of the generating/transmitting process of the search message in step S908 in FIG. 9.

First, in step S1001, whether the timing for referring to (obtaining) the static information has come or not is discriminated. If it is determined in step S1001 that the present timing is the timing for referring to (obtaining) the static information, step S1002 follows and a search request of the static information is added to the search request. If it is determined in step S1001 that the present timing is not the timing for referring to (obtaining) the static information, step S1002 is skipped and step S1003 follows.

In step S1003, whether the timing for referring to (obtaining) the semistatic information has come or not is discriminated. If it is determined in step S1003 that the present timing is the timing for referring to (obtaining) the semistatic information, step S1004 follows and a search request of the semistatic information is added to the search request. If it is determined in step S1003 that the present timing is not the timing for referring to the semistatic information, step S1004 is skipped and step S1005 follows.

In step S1005, whether the present time is the timing for referring to (obtaining) the dynamic information or not is discriminated. If it is determined in step S1005 that the present timing is the timing for referring to (obtaining) the dynamic information, step S1006 follows and a search request of the dynamic information is added to the search request for the directory server 420 in step S1007, which will be explained hereinlater. If it is determined in step S1005 that the present timing is not the timing for referring to the dynamic information, step S1006 is skipped and step S1007 follows.

In step S1007, the search message is generated from the search request and sent to the directory server 420. After that, the processing operation is finished.

There are two kinds of search messages. The first search message is used to request the getting of the device information of the device which satisfies a search equation. The search equation is included in the search message. The second search message is used to request the getting of the device information of the designated device. Information (for example, the name and the network address of the device) to designate the device is included in the search message.

For example, if the search equation and the search request of the semistatic information are included in the search message, the semistatic information of the device which satisfies the search equation is transmitted to the SLP user agent 411.

Subsequently, a method of setting the timing for registering/updating the device information and the timing for referring to (obtaining) it will be described.

Figures 11, 13:
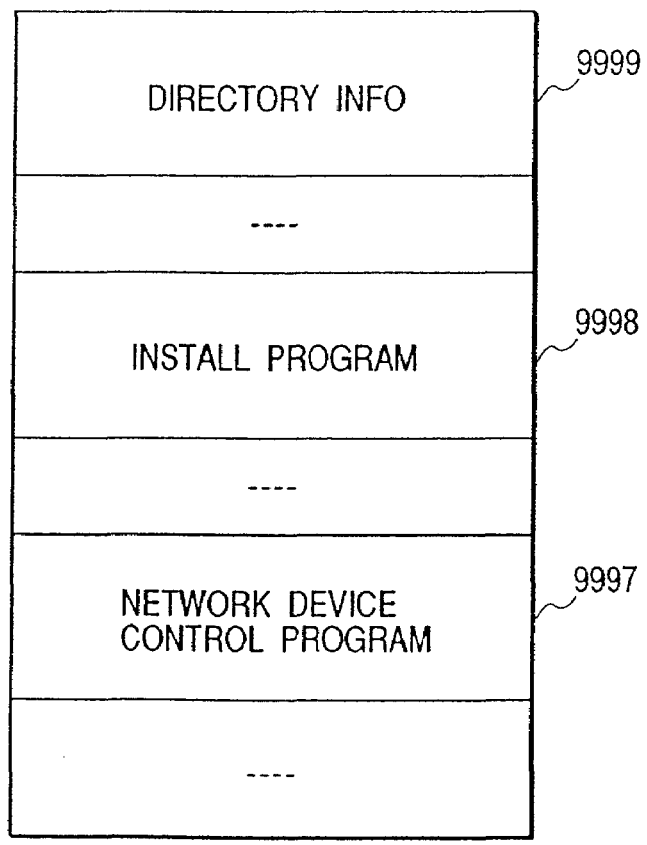
FIG. 11 is a diagram showing an example of a setup screen of a registering/updating timing of the device information of the device.
FIG. 13 is a diagram showing a memory map on a storage medium on which software of the device information management system according to an embodiment has been stored.

FIG. 11 is a diagram showing an example of a setup screen of the registering/updating timing of the device information on the display panel of the device 430. In the diagram, reference numeral 1100 denotes a setup screen for setting the registering/updating timing of the device information. The setup screen comprises a column 1101 for displaying a type of information and a column 1102 for displaying the registering/updating timing. The user changes the registering/updating timing on the display panel or by a remote operation.

In the example shown in FIG. 11, the static information is registered at the time of power-on. The semistatic information is registered into the directory server 420 when the power source is turned on and when the configuration of the device is changed (for example, when an option is added). Further, the dynamic information is registered into the directory server 420 when the power source is turned on and when the dynamic information is changed (for example, when an error arises, when a status is changed, when there is no paper, when there is not much toner left, when the printing operation is started, when the printing operation is finished, or when an off-line arises).

FIG. 11 shows a mere example. For instance, the registering/updating timing can be also set to the timing such as "every 5-minute interval" or the like as shown in FIG. 12.

FIG. 12 is a diagram showing an example of a setup screen which is displayed on the display screen of the user PC 410 and used to set the timing for referring to (obtaining) the device information. In the diagram, reference numeral 1200 denotes a setup screen for setting the timing for referring to the device information. The setup screen comprises: a device name 1201 for selecting a specific device and displaying its name; a column 1202 for displaying a type of information; and a column 1203 for displaying a reference timing. The user changes the timing for referring to (obtaining) the information type every device.

In the example shown in FIG. 12, the user PC 410 issues the search request of the static information for Mr. Color in response to an instruction of the user, issues one search request of the semistatic information every five hours, and issues one search request of the dynamic information every ten minutes.

FIG. 12 shows a mere example. For instance, the reference timing can be set to "not referred to" or the like.

FIG. 13 is a diagram showing a memory map of a CD-ROM as an example of a storage medium. In the diagram, reference numeral 9997 denotes an area where a control program (program based on the flowcharts of FIGS. 6 to 10) has been stored; 9998 an area where an install program has been stored; and 9999 an area where the directory information has been stored.

When the control program is installed into the PC 200, the install program stored in the area 9998 where the install program has been stored is first loaded into the system and executed by the CPU 201. Subsequently, the install program which is executed by the CPU 201 reads out the control program from the area 9997 where the control program has been stored and installs it onto the hard disk 211.

The invention can be applied to a system comprising a plurality of apparatuses (for example, host computer, interface equipment, reader, and the like) or an integrated apparatus or can be also applied to an apparatus comprising one equipment.

Naturally, the object of the invention is accomplished by a method whereby a storage medium on which program codes (control program) of software to realize the functions of the embodiment mentioned above have been stored is supplied to a system or an apparatus and a computer (a CPU or an MPU)

of the system or apparatus reads out and executes the program codes stored in the storage medium.

In this case, the program codes themselves read out from the storage medium realize the novel functions of the invention and the storage medium in which the program codes have been stored constructs the invention.

As for the storing apparatus according to the embodiment, the computer reads out and executes the control program stored in the storage medium, so that the functions of the embodiment mentioned above are realized. However, the invention is not limited to it but also incorporates a case where an OS (Operating System) or the like which is operating on the computer executes a part or all of the actual processes on the basis of instructions of the control program and the functions of the embodiment mentioned above are realized by those processes.

For example, a floppy disk, a hard disk, an optical disk, a magnetooptic disk, a CD-ROM (Compact Disk Read Only Memory), a CDR (Compact Disk Recordable), a magnetic tape, a non-volatile memory card, an ROM chip, or the like can be used as a storage medium for supplying the program codes.

Further, the program codes read out from the storage medium are written into a memory equipped for a function expanding board inserted in a computer or a function expanding unit connected to the computer, and after that, a CPU or the like equipped for the function expanding board or function expanding-unit executes a part or all of the actual processes, and the functions of the embodiment mentioned above can be realized by those processes.

Obviously, the invention can be also applied to a case where the program codes of software to realize the functions of the embodiment mentioned above are stored in a storage medium and the program codes are distributed from the storage medium to a requester via a communication line such as personal computer communication or the like.

According to the device information management system of the invention as described in detail above, there are effects such that the device can efficiently register/update the device information with the load of the network suppressed and the user PC can efficiently monitor the device information in a real-time manner with the load of the network suppressed.

According to the storage medium of the invention, there is an effect such that the device information management system of the invention can be smoothly controlled.

<Substitution of Registration of Device Information>

In the device information management system in FIG. 4, the device 431 itself transmits the registration message or updating message to the directory server 420. However, when a power shut-off or troubles occur in the device 430, there is a situation such that the device 430 itself cannot transmit the registration message or updating message. Therefore, a device information management system having a device for updating the device information in place of it (hereinafter, such a device is referred to as a substitute device) will now be described.

An SLP service agent and an SNMP (Simple Network Management Protocol) agent exist in a device (printer or the like) of the device information management system having the substitute device. The device executes the following processes at the time of power-on.

A search request is issued to the directory server and the substitute device (personal computer or the like) is searched (however, the substitute device includes an SNMP manager function and can collect the device information of the device without using the directory server. The substitute device also includes an SLP user agent and can transmit the search message or updating message to the directory server.)

SNMP_TRAP is transmitted to the detected substitute device and a request for the substitution is tried.

When the request for substitution is accepted to the substitute device, the device notifies the substitute device of the substituting conditions and updating contents. The substituting conditions show in which state the substitute-requested device makes the substitute-device execute a substitution process. The updating contents show which device information should be updated by the substitute device. The substituting conditions and the updating contents are notified by the SNMP. The substituting conditions are defined by an enterprise MIB (Management Information Base).

A permission of an access to the directory server is set so that the substitute device can change the device information registered in the directory server.

An SLP user agent and an SNMP manager exist in the substitute device (personal computer or the like). The substitute device executes the following processes.

The search/updating of the device information to the directory server is performed.

A status change of the substitute-requested device is monitored by using the SNMP.

When the updating of the device information registered in the directory server is substitute-requested from the device, the device information registered in the directory server is updated in place of the device in accordance with the substituting conditions.

An embodiment of the invention will now be described hereinbelow with reference to the drawings.

Figure 14:
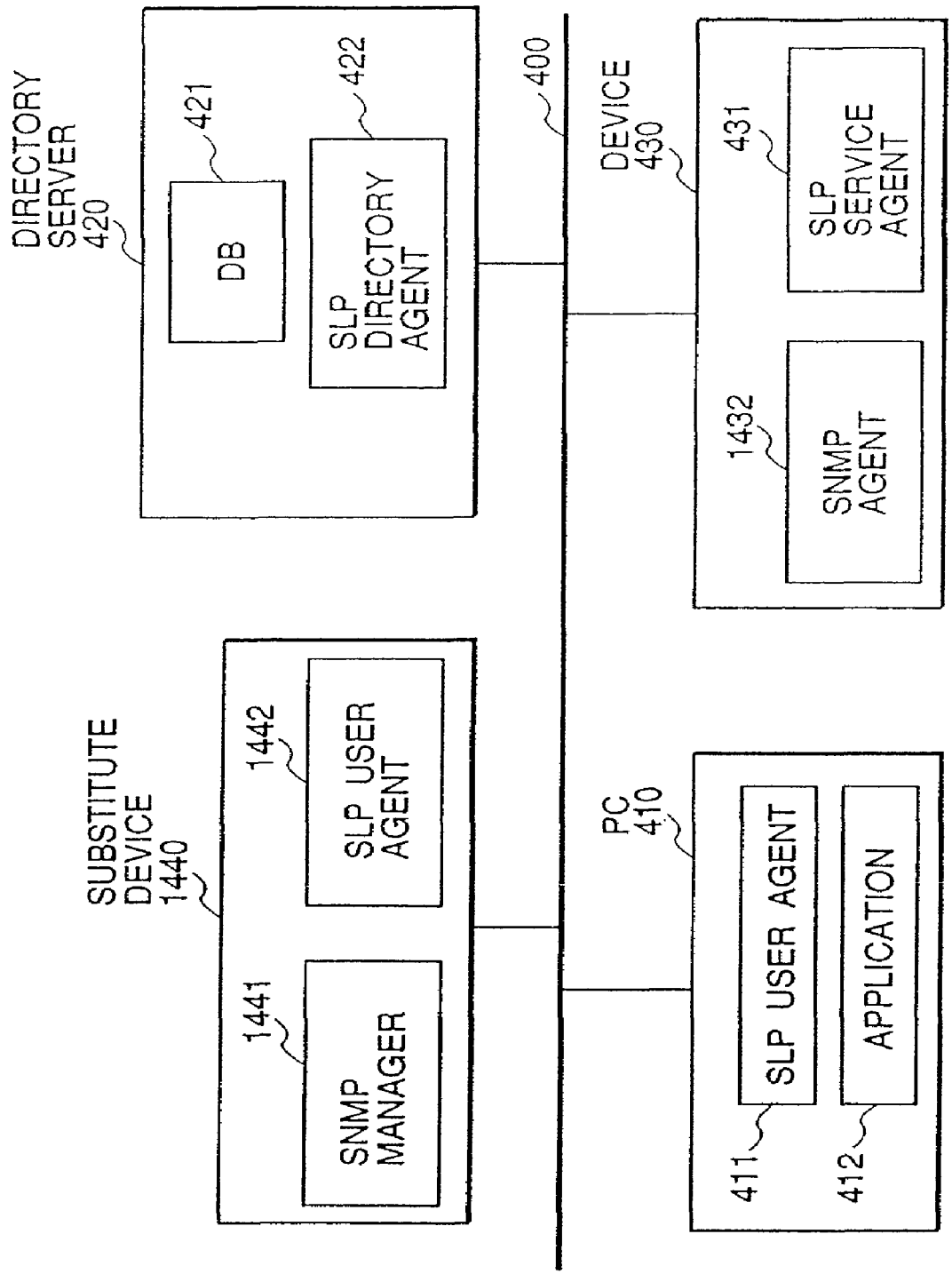
FIG. 14 is a model diagram of a device information management system having a substitute device.

FIG. 14 is a model diagram of a directory server, a device, a user personal computer (user PC), and a substitute-device in the device information management system having the substitute device according to the embodiment. The directory server 420 and user PC 410 are equivalent to those in FIG. 4.

In the diagram, reference numeral 1440 denotes a substitute device. The substitute device 1440 corresponds to the desk-top type PC 111 in FIG. 1. The substitute device 1440 has an SNMP manager 1441 and an SLP user agent 1442.

The device 430 further has an SNMP agent 1432.

The SNMP agent 1432 and SNMP manager 1441 can monitor the device status and perform a TRAP notification by an SNMP protocol.

Figure 15:
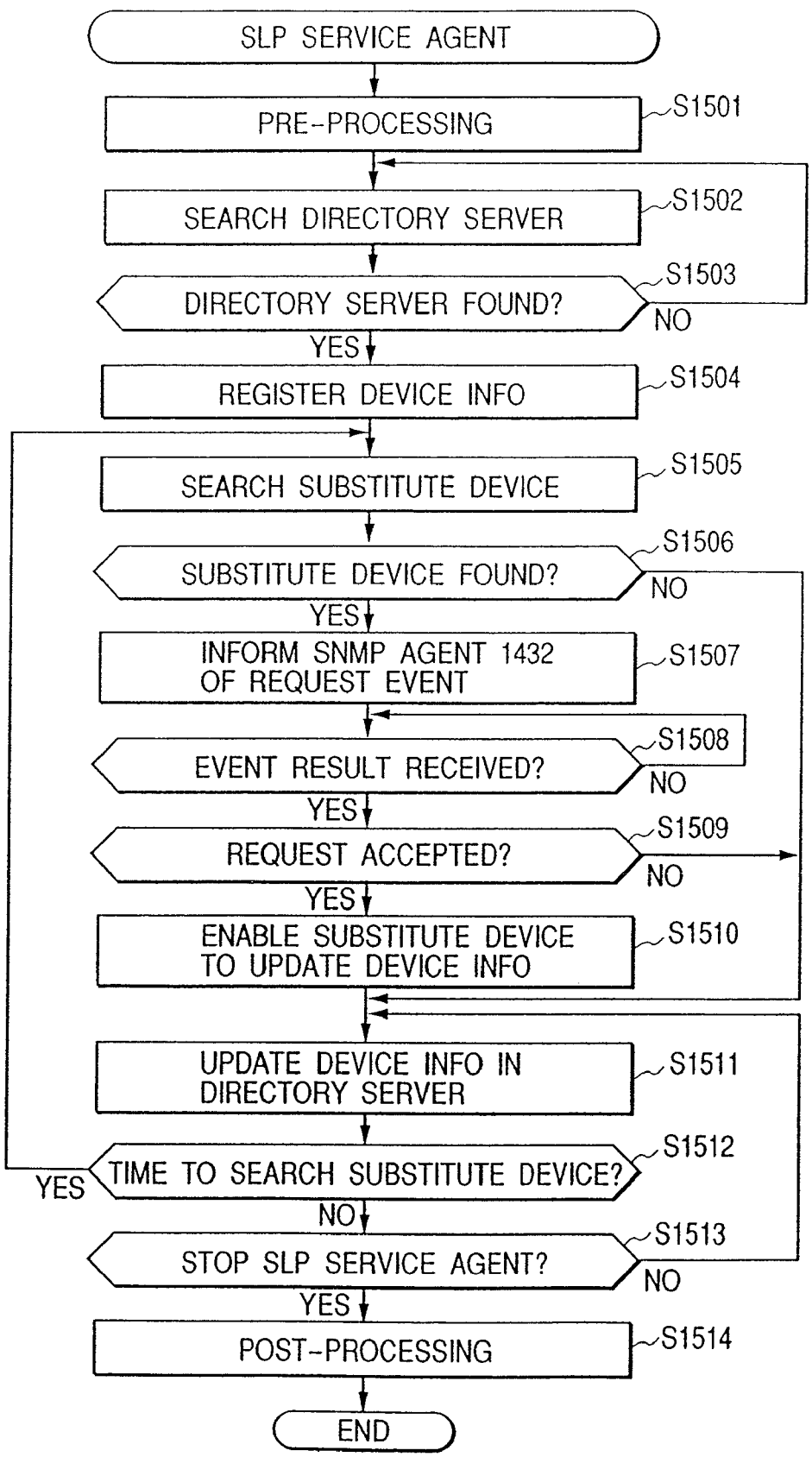
FIG. 15 is a flowchart showing the processing operation of the SLP service agent.

FIG. 15 is a flowchart showing the processing operation of the SLP service agent 431 in the device information management system according to the embodiment. In the diagram, first in step S1501, the SLP service agent 431 executes a pre-processing of the SLP service agent. Specifically speaking, the opening of a port for transmitting and receiving data to/from the other device, the obtaining of a necessary memory, the initialization of other variables, and the like are executed by an SLP protocol.

Subsequently, in step S1502, the directory server 420 on the network is searched. This search is executed by a service request of an SLP packet. In step S1503, whether the directory server 112 has been found or not is discriminated. When the directory server 420 exists on the network, there is a reply to the service request and the SLP service agent 431 can obtain a network address of the directory server 420.

When there is no reply to the service request of the SLP packet, it is determined that the directory server 112 cannot be found. The processing routine is returned to step S1502.

When there is a reply to the service request of the SLP packet, it is determined that the directory server 420 was found. The processing routine advances to step S1504. In step S1504, the device information is registered into the database 421 of the directory server 421.

After the initial registration of the device information, the presence or absence of the substitute device on the network is discriminated in step S1505 in order to prepare for the case where the device itself cannot update the registered information due to the occurrence of an abnormality such as power shut-off, troubles, or the like in the device. In the embodiment, the SLP service request (search message) is transmitted to the searched directory server 420 so as to search the device having the SNMP agent 1441.

Whether the substitute device has been found or not is discriminated in step S1506. When it is decided that the substitute device was found (in the case where there is a row of the device name "snmp admin" in the directory registration information 500 in FIG. 5), step S1507 follows. In step S1507, a request event (substitute request event) is notified to the SNMP agent 1432, thereby allowing the SNMP agent 1432 to transmit SNMP_TRAP of the substitute request to the substitute device 1440.

Whether a result (request event result) for SNMP TRAP has been received from the SNMP agent 1432 or not is discriminated in step S1508. When it is determined that the request event result was received, step S1509 follows. In step S1509, whether the request has been accepted or not is discriminated. When it is determined that the request was accepted, step S1510 follows. In step S1510, the substitute device also registers the device information so that the device information registered in the database 421 can be updated (deleted). Specifically speaking, "service:admin.canon.co.jp" is added to the updatable device address 509 in the directory registration information 500 in FIG. 5.

In step S1511, the device information in the directory server 112 is updated by the device itself in accordance with a change in device status. Specifically speaking, the registering/updating process of the device information is executed in accordance with a flowchart of FIG. 8. In next step S1512, the substitute device is searched again at a predetermined period in order to prepare for a case where the substitute device cannot be searched or a case where the request is not accepted although the substitute device can be searched. In step S1512, whether the time to search the substitute device (predetermined period) has come or not is discriminated. If it is determined that the time to search the substitute device came, the processing routine is returned to step S1505. If it is determined that the present time is not the time to search the substitute device, the processing routine advances to step S1513.

In step S1513, whether the SLP service agent 431 is stopped or not is discriminated. If it is determined that the SLP service agent 431 is not stopped, the processing routine is returned to step S1511. If it is determined that the SLP service agent 431 is stopped, the processing routine advances to step S1514. In step S1514, a post-processing of the SLP service agent is performed. Specifically speaking, the closure of the port, the opening of the memory, and the like are executed.

Figure 16:
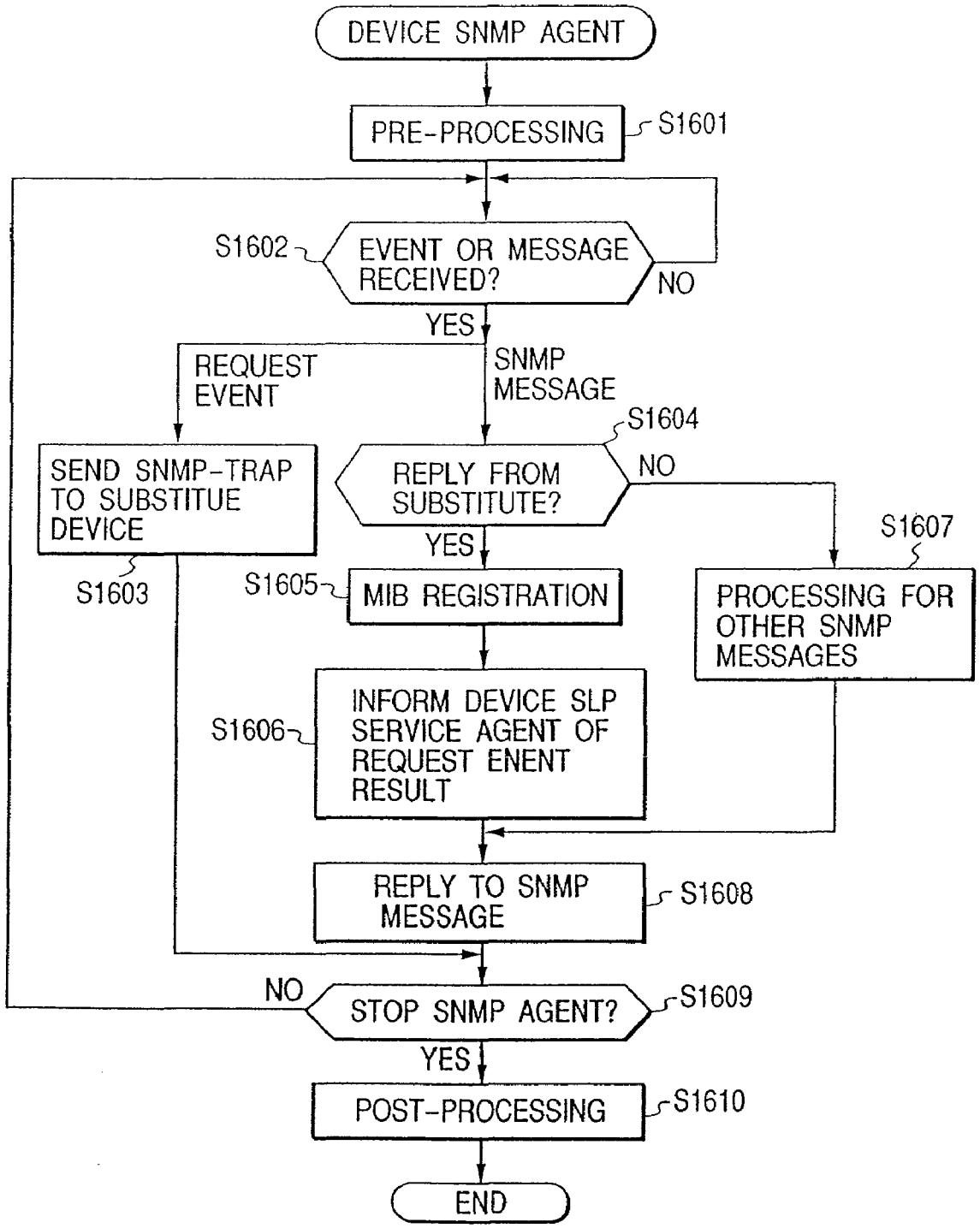
FIG. 16 is a flowchart showing the processing operation of an SNMP agent.

FIG. 16 is a flowchart showing the processing operation of the SNMP agent 1432 in the device information management system according to the embodiment.

First, in step S1601, the SNMP agent 1432 executes a pre-processing. Specifically speaking, the opening of the port to transmit and receive data to/from the other device, the obtaining of a necessary memory, the initialization of other variables, and the like are executed by an SNMP protocol. In step S1602, whether the event or SNMP message has been received or not is discriminated. If it is determined that the request event from the SLP service agent 431 was received, step S1603 follows. In step S1603, SNMP_TRAP for allowing the designated substitute device to update the device information is transmitted. After that, step S1609 follows. In the embodiment, a reply to SNMP_TRAP for the substitute request is returned by the SNMP message.

If it is determined in step S1602 that the SNMP message was received, step S1604 follows. In step S1604, whether the SNMP message received in step S1602 is the reply message from the substitute device or not is discriminated. If it is determined that it is the reply message from the substitute device, step S1605 follows. In step S1605, the reply result is MIB registered (message process) as information regarding the substitute device. In the MIB registration, "anotherManager" and "anotherManagerNetworkAddress" are registered in accordance with a definition shown in FIG. 19, which will be explained hereinlater.

In step S1606, subsequently, the request event result (result indicating whether the request was accepted or not) is notified to the SLP service agent 431. In step S1608, a reply process to the SNMP message is performed. After that, step S1609 follows.

If it is decided in step S1604 that the SNMP message is not the reply message from the substitute device, step S1607 follows. In step S1607, a processing for the other SNMP messages is performed. Step S1608 follows.

In step S1609, whether the SNMP agent 1432 is stopped or not is discriminated. If it is determined that the SNMP agent 1432 is not stopped, the processing routine is returned to step S1602. If it is determined that the SNMP agent 1432 is stopped, the processing routine advances to step S1610. In step S1610, a post-processing is executed. Specifically speaking, the closure of the port, the opening of the memory, and the like are executed.

Figure 17:
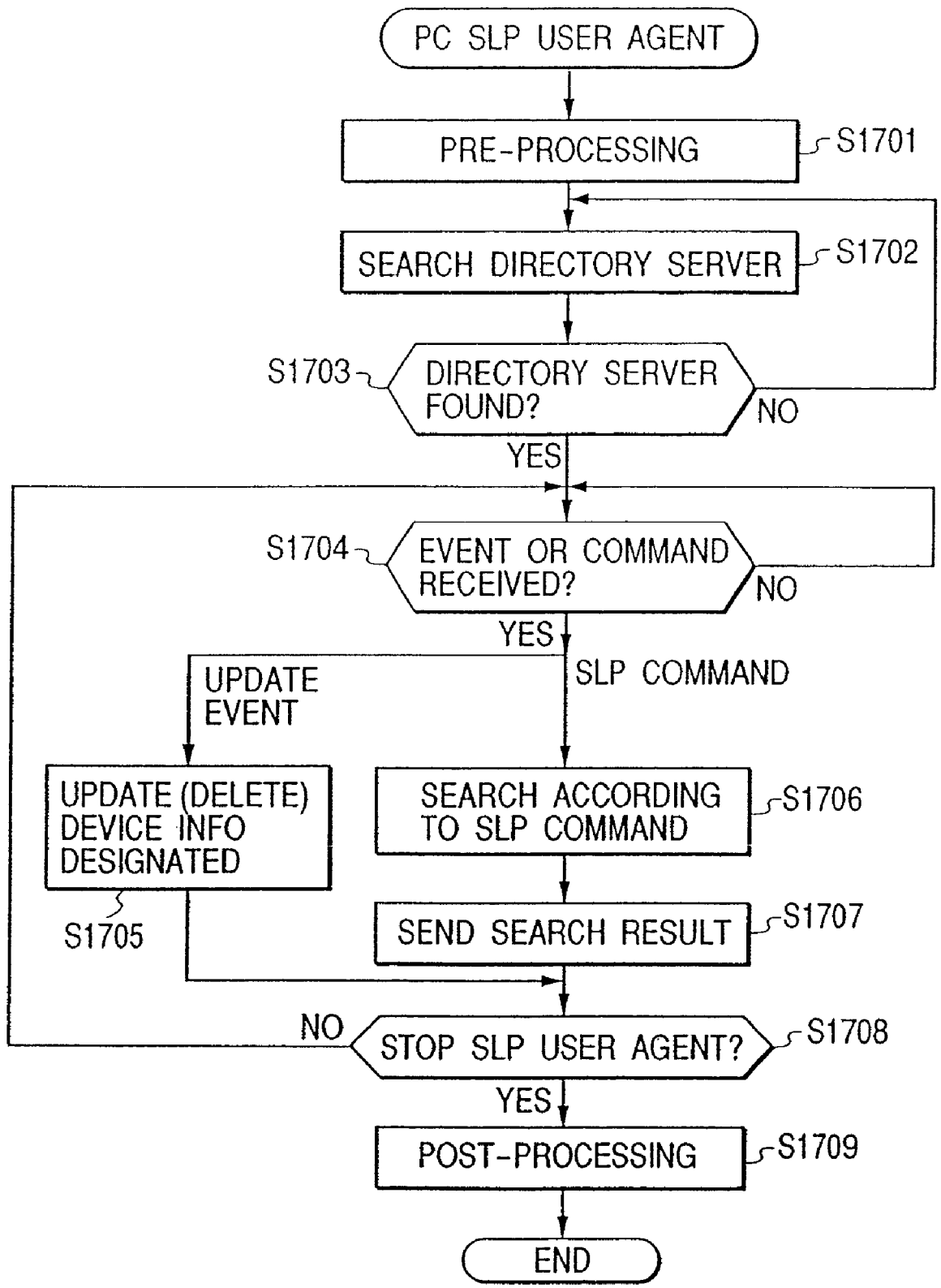
FIG. 17 is a flowchart showing the processing operation of the SLP user agent.

FIG. 17 is a flowchart showing the processing operation of the SLP user agent 1442 in the device information management system according to the embodiment.

First, in step S1701, the SLP user agent 1442 executes a pre-processing. Specifically speaking, the opening of the port to transmit and receive data to/from the other device, the obtaining of a necessary memory, the initialization of other variables, and the like are executed by the SLP protocol. In step S1702, subsequently, the directory server 420 on the network is searched. This search is executed in response to a service request of the SLP packet. In step S1703, whether the directory server 420 has been found or not is discriminated. When the directory server 420 exists on the network, there is a reply to the service request and the SLP user agent 1442 of the printer device can obtain the network address of the directory server 420. If there is no reply to the service request of the SLP packet, it is determined that the directory server 420 is not found yet. The processing routine is returned to step S1702.

When there is the reply to the service request of the SLP packet, it is determined that the directory server 420 was found. The processing routine advances to next step S1704. In step S1704, whether a registration updating (deleting) event or an SLP command from the SNMP manager 1441 has been received or not is discriminated. If it is determined that the registration update (delete) event from the SNMP manager 1441 was received, step S1705 follows. In step S1705, the SNMP manager 1441 is controlled so as to obtain the device information from the device 431, and the registration message or updating message is sent to the SLP directory agent 422 in order to register or update the device information on the basis of the device information obtained from the device 431. At this time, a registering process similar to that in the flowchart shown in FIG. 8 is executed.

If it is determined in step S1704 that the SLP command was received, step S1706 follows. In step S1706, a searching process (for example, the search message is sent to the SLP directory agent 422) is performed in accordance with the SLP command. The processing result is transmitted in next step S1707.

In step S1708, whether the SLP user agent 1442 is stopped or not is discriminated. If it is determined that the SLP user agent 1442 is not stopped, the processing routine is returned to step S1704. If it is determined that the SLP user agent 1442 is stopped, step S1709 follows. A post-processing is executed in step S1709. Specifically speaking, the closing of the port, the opening of the memory, and the like are executed.

Figure 18:
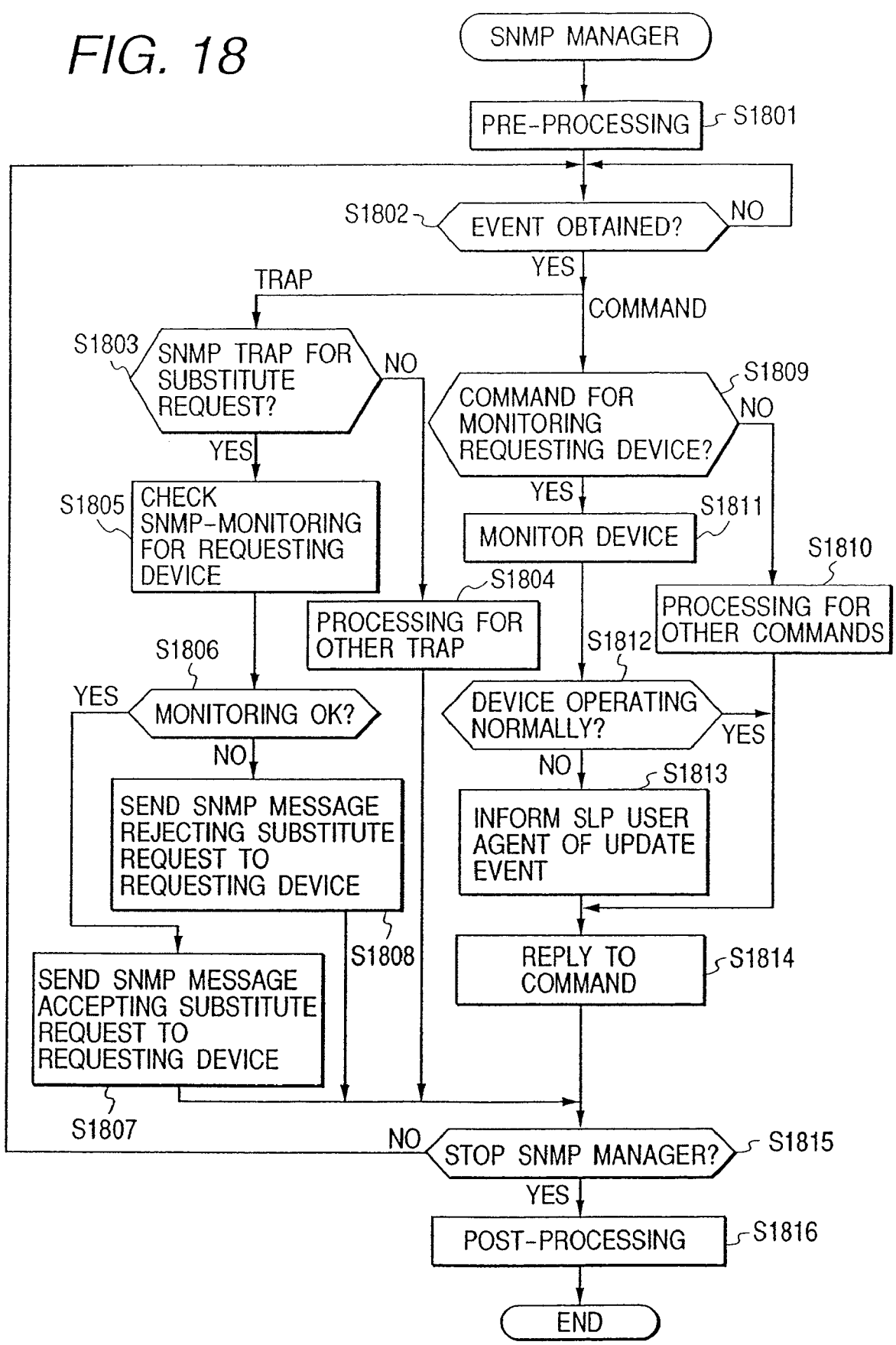
FIG. 18 is a flowchart showing the processing operation of an SNMP manager.

FIG. 18 is a flowchart showing the processing operation of the SNMP manager 1441 in the device information management system according to the embodiment.

First, in step S1801, the SNMP manager 1441 executes a pre-processing. Specifically speaking, the opening of the port to transmit and receive data to/from the other device, the obtaining of a necessary memory, the initialization of other variables, and the like are executed by the SNMP protocol. In step S1802, whether the event has been received or not is discriminated. If it is determined that the event was received and it indicates the TRAP reception, step S1803 follows. In step S1803, whether the event obtained in step S1802 is SNMP_TRAP for the substitute request or not.

If it is determined that the obtained event is SNMP_TRAP for the substitute request to the directory server 420, step S1805 follows. In step S1805, whether the status of the substitute requesting device 430 can be monitored or not (whether the designated device can be monitored or not by SNMP) is discriminated by using the SNMP protocol. This discrimination can be performed by transmitting the command by the SNMP protocol to the network address of the substitute requesting device.

Subsequently, whether the monitoring by SNMP of the designated device is possible or not is discriminated in step S1806. If it is determined that the monitoring by SNMP of the designated device is possible, step S1807 follows. In step S1807, an SNMP message indicative of the substitute acceptance is sent to the substitute requesting device. If it is determined in step S1806 that the monitoring by SNMP of the designated device is impossible, step S1808 follows. In step S1808, an SNMP message indicative of the substitute rejection is sent.

If it is determined in step S1803 that the obtained event is not SNMP_TRAP indicative of the updating substitute of the device information registered in the directory server 420, step S1804 follows. In step S1804, another TRAP processing is executed.

If it is determined in step S1802 that the event was received and it indicates the command reception, step S1809 follows. In step S1809, whether the event obtained in step S1802 indicates a monitor command of the substitute requesting device or not is discriminated. If it is determined that the obtained event indicates the monitor command of the substitute requesting device, step S1811 follows and the device is monitored. Subsequently, in step S1812, whether the substitute requesting device is normally operating or not is discriminated. If it is determined that the device is not normally operating (abnormal), next step S1813 follows. In step S1813, the updating (deleting) event of the device information registered in the directory server 420 is notified to the SLP user agent 1442.

If it is decided in step S1809 that the obtained event is not the monitor command, step S1810 follows and a processing for other commands is executed.

If it is determined in step S1812 that the substitute requesting device is normally operating, step S1813 is skipped and step S1814 follows.

A reply process to the command is performed in step S1814.

Whether the SNMP manager 1441 is stopped or not is discriminated in step S1815. If it is determined that the SNMP manager 1441 is not stopped, the processing routine is returned to step S1802. If it is determined that the SNMP manager 1441 is stopped, the processing routine advances to step S1816. A post-processing is executed in step S1816. Specifically speaking, the closing of the port, the opening of the memory, and the like are performed.

FIG. 19 is a diagram showing an example of MIB information for requesting the substitution in the device information management system according to the embodiment. In the embodiment, "anotherManager", "deviceCondition", "anotherManagerAction", and "anotherManagerNetworkAddress" are defined as information regarding the substitute device.

According to the device information management system according to the embodiment, the computer reads out and executes the control program stored in the storage medium, so that the functions of the embodiment mentioned above are realized. However, the invention is not limited to such an embodiment but naturally also incorporates a case where an OS (Operating System) or the like which is operating on the computer executes a part or all of the actual processes on the basis of instructions of the control program and the functions of the embodiment mentioned above are realized by those processes.

The control program according to the invention can be loaded into the PC 200 shown in FIG. 2 or onto a device that is equivalent thereto from an external storage medium via a storage medium or a network such as E-mail, personal computer communication, or the like and executed. The invention can be also applied to such a case.

For example, a floppy disk, a hard disk, an optical disk, a magnetooptic disk, a CD-ROM (Compact Disk Read Only Memory), a CD-R (Compact Disk Recordable)), a magnetic tape, a non-volatile memory card, an ROM chip, or the like can be used as a storage medium for storing the control program.

As described in detail above, according to the device information management system of the invention, even in the case where an abnormality such as power shut-off, troubles, or the like arises in the device and the device itself cannot update the registration information, the substitute device can be allowed to update the registration information and there is an effect such that the actual device status is matched with the registered device information.

According to the storage medium of the invention, there is an effect such that the foregoing device information management system of the invention can be smoothly controlled.

Figure 20:
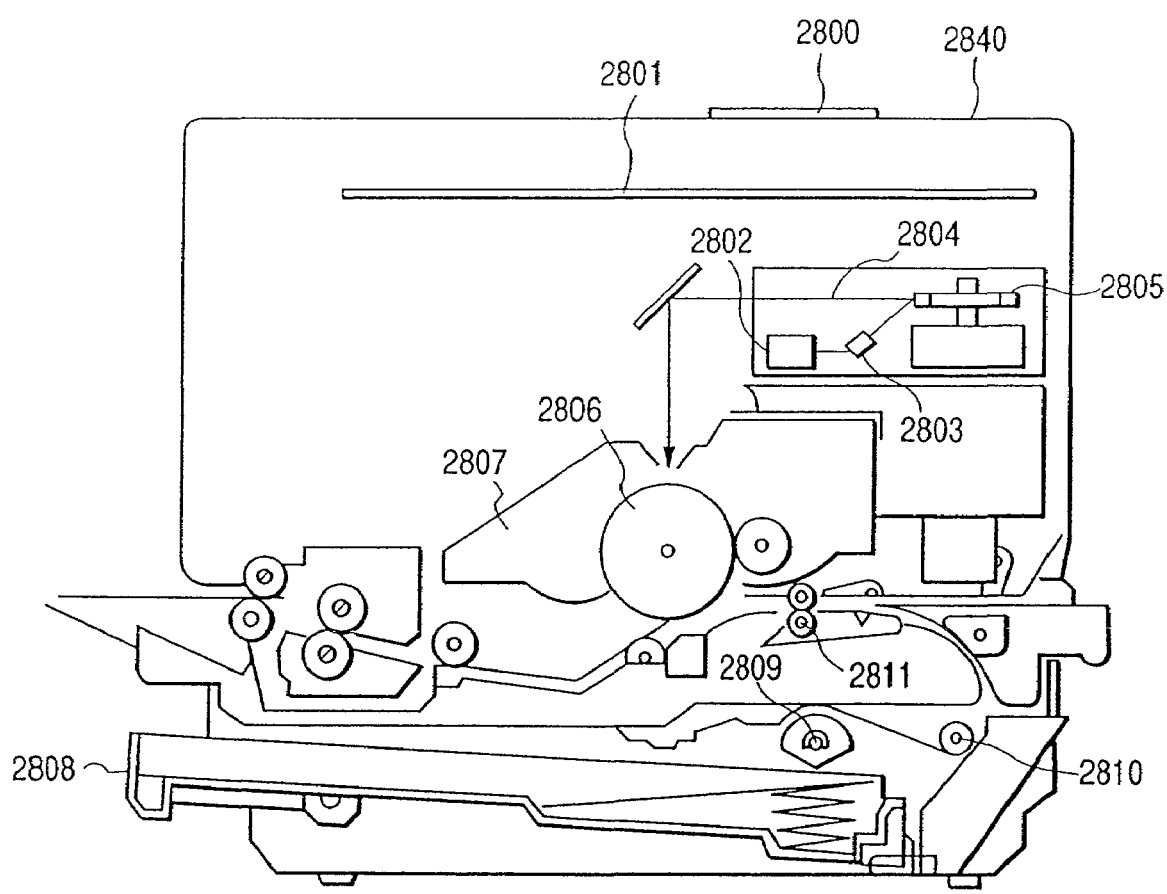
FIG. 20 is a cross sectional view showing an internal structure of a laser beam printer.

A laser beam printer can be mentioned as an example of the printer. FIG. 20 is a cross sectional view showing an internal structure of the laser beam printer (hereinafter, abbreviated to LBP). The LBP can input character pattern data or the like and print it onto a recording paper.

In FIG. 20, reference numeral 2840 denotes an LBP main body for forming an image onto the recording paper as a recording medium on the basis of a supplied character pattern or the like; 2800 an operation panel on which switches for operation, an LED display, and the like are arranged; and

2801 a printer control unit for controlling the whole LBP 2840 and analyzing character pattern information or the like. The printer control unit 2801 converts mainly the character pattern information into a video signal and outputs it to a laser driver 2802.

The laser driver 2802 is a circuit for driving a semiconductor laser 2803 and on/off switches a laser beam 2804 which is emitted from the semiconductor laser 2803 in accordance with an inputted video signal. The laser beam 2804 is swung right and left by a rotary polygon mirror 2805 and scans on an electrostatic drum 2806. Thus, an electrostatic latent image of a character pattern is formed on the electrostatic drum 2806. The latent image is developed by a developing unit 2807 around the electrostatic drum 2806 and, thereafter, the developed image is transferred onto the recording paper. Cut sheets are used as recording papers. The cut sheet recording papers are enclosed in a plurality of sheet cassettes 2808 corresponding to a plurality of kinds of papers loaded in the LBP 2840, conveyed into the apparatus by a paper feed roller 2809 and conveying rollers 2810 and 2811, and supplied to the electrostatic drum 2806.

Figure 21:
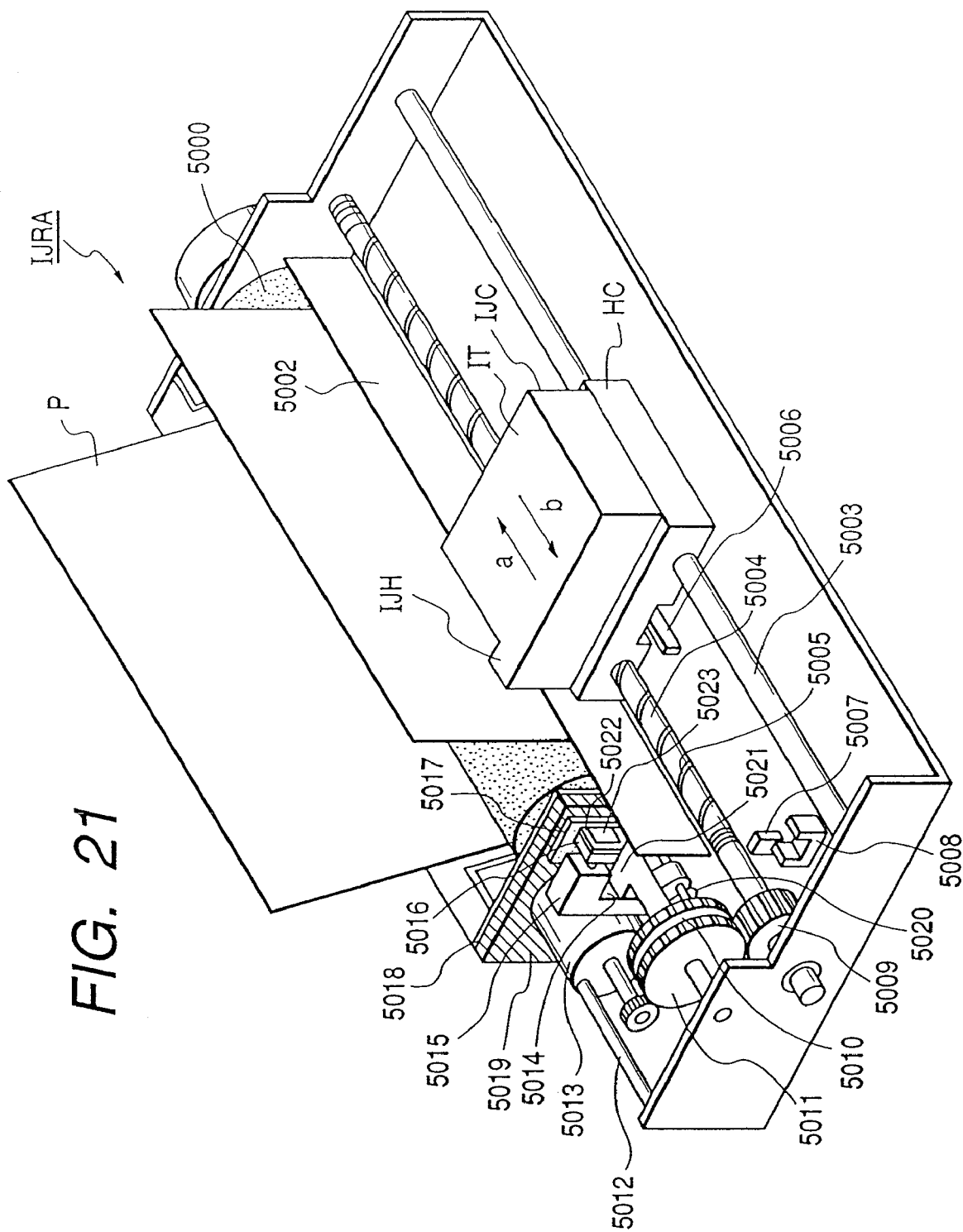
FIG. 21 is a schematic external view of an ink jet recording apparatus IJRA which can feed a plurality of kinds of papers in correspondence to a print job.

An ink jet printer can be also mentioned as an example of the printer. FIG. 21 is a schematic external view of an ink jet recording apparatus IJRA which can feed a plurality of kinds of papers (not shown) in correspondence to a print job.

In the diagram, a lead screw 5005 rotates via driving force transfer gears 5011 and 5009 in an interlocking relational manner with the forward/reverse rotation of a driving motor 5013. A carriage HC which is come into engagement with a spiral groove 5004 of the lead screw 5005 has a pin (not shown) and is reciprocated in the directions shown by arrows a and b. An ink jet cartridge IJC is mounted on the carriage HC. Reference numeral 5002 denotes a paper pressing plate for pressing the paper onto a platen 5000 in a range corresponding to the moving direction of the carriage. Reference numerals 5007 and 5008 denote photocouplers serving as home position detecting means for confirming the existence of a lever 5006 of the carriage in a region where the photocoupler is arranged and performing the switching of the rotating direction of the motor 5013, or the like. Reference numeral 5016 denotes a member for supporting a cap member 5022 for capping the front side of a recording head; and 5015 sucking means for sucking the air in the cap and performing a sucking and a recovery of the recording head via an opening 5023 in the cap. Reference numeral 5017 denotes a cleaning blade and 5019 indicates a member for enabling the cleaning blade to be moved in the forward/backward direction, and those component elements are supported to a main body supporting plate 5018. The blade is not limited to a shape shown in the diagram but a well-known cleaning blade can be obviously applied to the invention. Reference numeral 5021 denotes a lever to start the sucking in the sucking/recovery operation. The lever 5021 is moved in association with the movement of a cam 5020 adapted to be come into engagement with the carriage. A driving force from the driving motor is transferred by well-known transfer means such as clutch switching or the like. The capping, cleaning, and sucking/recovery are constructed in such a manner that a desired process can be performed at a corresponding position by the operation of the lead screw 5005 when the carriage reaches an area on the home position side. However, if a desired operation is performed at a well-known timing, the invention can be applied to any construction.

What is claimed is:

1. A network device that communicates with a server apparatus and sends a write request to the server apparatus without receiving a request from the server apparatus, said network device comprising:

a request unit constructed to make a request for registering, updating or deleting device information of said network device in a predetermined area of the server apparatus, an access right being required to write into the predetermined area;

a specifying unit constructed to specify a substitute device that registers, updates or deletes the device information of said network device; and a setting unit constructed to set the access right such that the substitute device specified by said specifying unit is enabled to register, update or delete the device information of said network device in the predetermined area of the server apparatus.

2. A network device according to claim 1, wherein the specified substitute device registers, updates or deletes the device information of said network device when said network device cannot update the device information.

3. A network device according to claim 1, further comprising a detection unit constructed to detect an abnormality that has occurred in said network device, wherein the specified substitute device registers, updates or deletes the device information of said network device when said detection unit detects the abnormality.

4. A network device according to claim 3, wherein the abnormality is a power shut-off status.

5. A network device according to claim 3, wherein the abnormality is a trouble.

6. A network device according to claim 1, wherein when a device accepts registering or updating the device information of said network device, said specifying unit specifies the device as the substitute device.

7. A server apparatus for communication with a network apparatus that sends a write request to said server apparatus without receiving a request from said server apparatus, said server apparatus comprising:

a reception unit constructed to receive a request for registering, updating or deleting device information of the network device in a predetermined area of said server apparatus, an access right being required to write into the predetermined area;

a discrimination unit constructed to discriminate, based on the request received by said reception unit, whether the network device has authority to register, update or delete the device information of the network device in the predetermined area of said server apparatus; and an execution unit constructed to register, update or delete the device information of the network device in the predetermined area of said server apparatus, based on the request received by said reception unit, if said discrimination unit discriminates that the network device has the authority.

8. A server apparatus according to claim 7, further comprising an informing unit constructed to inform execution results provided by said execution unit.

9. A computer implemented method for a network device that communicates with a server apparatus and sends a write request to the server apparatus without receiving a request from the server apparatus, comprising:

a processor performing the steps of:

a request step of requesting to register, update or delete device information of said network device in a predetermined area of the server apparatus, an access right being required to write into the predetermined area;

a specifying step of specifying a substitute device that registers, updates or deletes the device information of said network device; and a setting step of setting the access right such that the substitute device specified by said specifying step is enabled to register, update or delete the device information of said network device in the predetermined area of the server apparatus.

10. A method according to claim 9, wherein the specified substitute device registers, updates or deletes the device information of said network device when said network device cannot update the device information.

11. A method according to claim 9, further comprising a detection step of detecting an abnormality that has occurred in said network device, wherein the specified substitute device registers, updates or deletes the device information of said network device when said detection step detects the abnormality.

12. A method according to claim 11, wherein the abnormality is a power shut-off status.

13. A method according to claim 11, wherein the abnormality is a trouble.

14. A method according to claim 9, wherein when a device accepts registering or updating the device information of said network device, said specifying step specifies the device as the substitute device.

15. A computer implemented method for a server apparatus for communication with a network apparatus that sends a write request to said server apparatus without receiving a request from said server apparatus, comprising:

a processor performing the steps of:

a reception step of receiving a request for registering, updating or deleting device information of the network device in a predetermined area of said server apparatus, an access right being required to write into the predetermined area;

a discrimination step of discriminating, based on the request received by said reception step, whether the network device has authority to register, update or delete the device information of the network device in the predetermined area of said server apparatus; and an execution step of executing to register, update or delete the device information of the network device in the predetermined area of said server apparatus, based on the request received by said reception step, if said discrimination step discriminates that the network device has the authority.

16. A method according to claim 15, further comprising an informing step of informing execution results provided by said execution step.

17. A computer-readable storage medium on which is stored a computer program that implements a method for a network device that communicates with a server apparatus and sends a write request to the server apparatus without receiving a request from the server apparatus, said method comprising:

a request step of requesting to register, update or delete device information of said network device in a predetermined area of the server apparatus, an access right being required to write into the predetermined area;

a specifying step of specifying a substitute device that registers, updates or deletes the device information of said network device; and a setting step of setting the access right such that the substitute device specified by said specifying step is enabled to register, update or delete the device information of said network device in the predetermined area of the server apparatus.

18. A computer-readable storage medium on which is stored a computer program that implements a method for a server apparatus for communication with a network apparatus that sends to a write request to said server apparatus without receiving a request from said server apparatus, said method comprising:

a reception step of receiving a request for registering, updating or deleting device information of the network device in a predetermined area of said server apparatus, an access right being required to write into the predetermined area;

a discrimination step of discriminating, based on the request received by said reception step, whether the network device has authority to register, update or delete the device information of the network device in the predetermined area of said server apparatus; and an execution step of executing to register, update or delete the device information of the network device in the predetermined area of said server apparatus, based on the request received by said reception step, if said discrimination step discriminates that the network device has the authority.

* * * * *